(12) United States Patent
Ahn et al.

(10) Patent No.: US 12,158,775 B2
(45) Date of Patent: Dec. 3, 2024

(54) ELECTRONIC DEVICE INCLUDING DISPLAY PANEL

(71) Applicant: SAMSUNG ELECTRONICS CO., LTD., Suwon-si (KR)

(72) Inventors: Sungho Ahn, Suwon-si (KR); Jihyung Jung, Suwon-si (KR); Inkuk Yun, Suwon-si (KR); Myunghoon Kwak, Suwon-si (KR); Yangwook Kim, Suwon-si (KR); Jookwan Lee, Suwon-si (KR); Hyunju Hong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 28 days.

(21) Appl. No.: 18/077,532

(22) Filed: Dec. 8, 2022

(65) Prior Publication Data

US 2023/0229190 A1  Jul. 20, 2023

Related U.S. Application Data

(63) Continuation of application No. PCT/KR2022/017006, filed on Nov. 2, 2022.

(30) Foreign Application Priority Data

Jan. 14, 2022  (KR) .................. 10-2022-0005700
Apr. 4, 2022  (KR) .................. 10-2022-0041788

(51) Int. Cl.
*G06F 1/16*   (2006.01)
(52) U.S. Cl.
CPC .......... *G06F 1/1624* (2013.01); *G06F 1/1641* (2013.01); *G06F 1/1652* (2013.01)

(58) Field of Classification Search
CPC ..... G06F 1/1624; G06F 1/1641; G06F 1/1652
See application file for complete search history.

(56) References Cited

U.S. PATENT DOCUMENTS 9,733,668 B2 * 8/2017 Park ...................... G04G 17/08
9,891,725 B2 * 2/2018 Lindblad ............... G06F 3/0416
(Continued)

FOREIGN PATENT DOCUMENTS

CN   106711183   5/2017
CN   107068862   8/2017
(Continued)

OTHER PUBLICATIONS

Search Report dated Feb. 10, 2023 in counterpart International Patent Application No. PCT/KR2022/017006.

*Primary Examiner* — Rockshana D Chowdhury
(74) *Attorney, Agent, or Firm* — Nixon & Vanderbye, P.C.

(57) ABSTRACT

An electronic device may include a plurality of housings including a first housing and a second housing, wherein the first housing movably connects to the second housing in a moving direction, a display panel in which a screen display area visually exposed to an outside changes depending on a movement of the second housing relative to the first housing, and a lattice plate disposed on a rear surface of the display panel to support the display panel. The display panel may include a flat portion forming the screen display area and comprising a surface substantially forming a flat surface, an edge portion connected to one end portion of the flat portion and comprising at least a partial region which is curved, and a bending portion connected to the other end portion of the flat portion opposite to the edge portion and comprising at least a partial region which bends according to a movement of the first housing relative to the second housing. The lattice plate may include a first lattice portion disposed on a rear (Continued)

surface of the edge portion and including a first lattice pattern, and a second lattice portion disposed on a rear surface of the bending portion and including a second lattice pattern that is different from the first lattice pattern so as to have a relatively higher modulus than the first lattice portion.

20 Claims, 16 Drawing Sheets

(56) References Cited

U.S. PATENT DOCUMENTS

| | | | | |
|---|---|---|---|---|
| 10,194,543 | B2* | 1/2019 | Seo | G09F 9/301 |
| 11,012,546 | B1* | 5/2021 | Song | G06F 1/1656 |
| 11,108,011 | B2 | 8/2021 | Kim et al. | |
| 11,216,106 | B2* | 1/2022 | Lindblad | G06F 3/0412 |
| 11,266,029 | B2* | 3/2022 | Kim | H05K 5/0226 |
| 11,416,036 | B2* | 8/2022 | Yin | G06F 1/1652 |
| 11,662,771 | B2* | 5/2023 | Kim | G06F 1/1652 |
| | | | | 361/679.01 |
| 11,747,861 | B2* | 9/2023 | Zhang | G06F 1/1652 |
| | | | | 361/679.27 |
| 11,810,482 | B2* | 11/2023 | Wu | G06F 1/1652 |
| 11,812,565 | B2* | 11/2023 | Seki | G09F 9/301 |
| 11,899,494 | B2* | 2/2024 | Zhang | G06F 1/1624 |
| 11,908,349 | B2* | 2/2024 | Zhao | G06F 1/1652 |
| 11,997,804 | B2* | 5/2024 | Kim | H05K 5/0017 |
| 2015/0325804 | A1* | 11/2015 | Lindblad | H10K 59/40 |
| | | | | 313/511 |
| 2018/0103552 | A1* | 4/2018 | Seo | H05K 5/0017 |
| 2020/0004296 | A1* | 1/2020 | Lee | G06F 1/1641 |
| 2020/0052239 | A1 | 2/2020 | Kim et al. | |
| 2020/0135065 | A1* | 4/2020 | Song | H05K 1/028 |
| 2020/0170127 | A1* | 5/2020 | Kim | H05K 5/0226 |
| 2021/0074189 | A1* | 3/2021 | Kwon | H05K 5/0217 |
| 2021/0104582 | A1 | 4/2021 | Kim et al. | |
| 2022/0130287 | A1* | 4/2022 | Feng | H10K 59/10 |

FOREIGN PATENT DOCUMENTS

| | | |
|---|---|---|
| KR | 10-2016-0027679 | 3/2016 |
| KR | 10-2016-0035624 | 4/2016 |
| KR | 10-2016-0095285 | 8/2016 |
| KR | 10-2017-0064165 | 6/2017 |
| KR | 10-2018-0036904 | 4/2018 |
| KR | 10-2019-0049454 | 5/2019 |
| KR | 10-2019-0112535 | 10/2019 |
| KR | 10-2021-0150308 | 12/2021 |

* cited by examiner

ELECTRONIC DEVICE INCLUDING DISPLAY PANEL

CROSS-REFERENCE TO RELATED APPLICATIONS

This application is a continuation application of International Application No. PCT/KR2022/017006 designating the United States, filed on Nov. 2, 2022, in the Korean Intellectual Property Receiving Office and claiming priority to Korean Patent Application No. 10-2022-0005700, filed on Jan. 14, 2022, and Korean Patent Application No. 10-2022-0041788, filed on Apr. 4, 2022, in the Korean Intellectual Property Office, the disclosures of which are incorporated by reference herein in their entireties.

BACKGROUND

1. Field

The disclosure relates to an electronic device including a display panel.

2. Description of Related Art

Electronic devices are gradually becoming slimmer and are being developed in various manners to strengthen a design aspect, while differentiating functions. Electronic devices are being transformed from a uniform rectangular shape into a variety of shapes.

A display panel is an output device that expresses various colors through an operation in pixel units or sub-pixel units, and an electronic device including the display panel outputs light or provides visual information to a user. Research has been conducted into an electronic device to implement a transformable structure that is easy to carry and employs a large-screen display.

According to an example of an electronic device, a display may be provided on a plurality of housings and may fold or unfold while the plurality of housings forms an angle. According to another example of an electronic device, one housing may move relative to another housing such that a screen display area of the display may expand.

According to another example of an electronic device, a display panel of the electronic device may include an edge portion for generating a side display to expand a screen display area or receive a gesture input different from other areas.

SUMMARY

An edge portion of an electronic device may be formed by implementing a curved structure within a relatively short area. Compared with a flat portion of a display panel, the edge portion of the electronic device has a high resistance for a stress due to the curved structure.

Resistance on an edge portion of an electronic device may make it more difficult to manufacture the electronic device including the edge portion and lead to an issue of a display panel lifting or deforming.

The technical goals to be achieved through embodiments of the present disclosure are not limited to those described above, and other technical goals not mentioned above will be clearly understood from the following description.

According to an embodiment, an electronic device may include a plurality of housings including a first housing and a second housing, wherein the first housing movably connects to the second housing in a moving direction, a display panel in which a screen display area visually exposed to an outside changes depending on a movement of the second housing relative to the first housing, and a lattice plate disposed on a rear surface of the display panel to support the display panel. The display panel may include a flat portion forming the screen display area and comprising a surface substantially forming a flat surface, an edge portion connected to one end portion of the flat portion and comprising at least a partial region which is curved, and a bending portion connected to the other end portion of the flat portion opposite to the edge portion and comprising at least a partial region which bends according to a movement of the first housing relative to the second housing. The lattice plate may include a first lattice portion disposed on a rear surface of the edge portion and including a first lattice pattern, and a second lattice portion disposed on a rear surface of the bending portion and including a second lattice pattern that is different from the first lattice pattern so as to have a relatively higher modulus than the first lattice portion.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
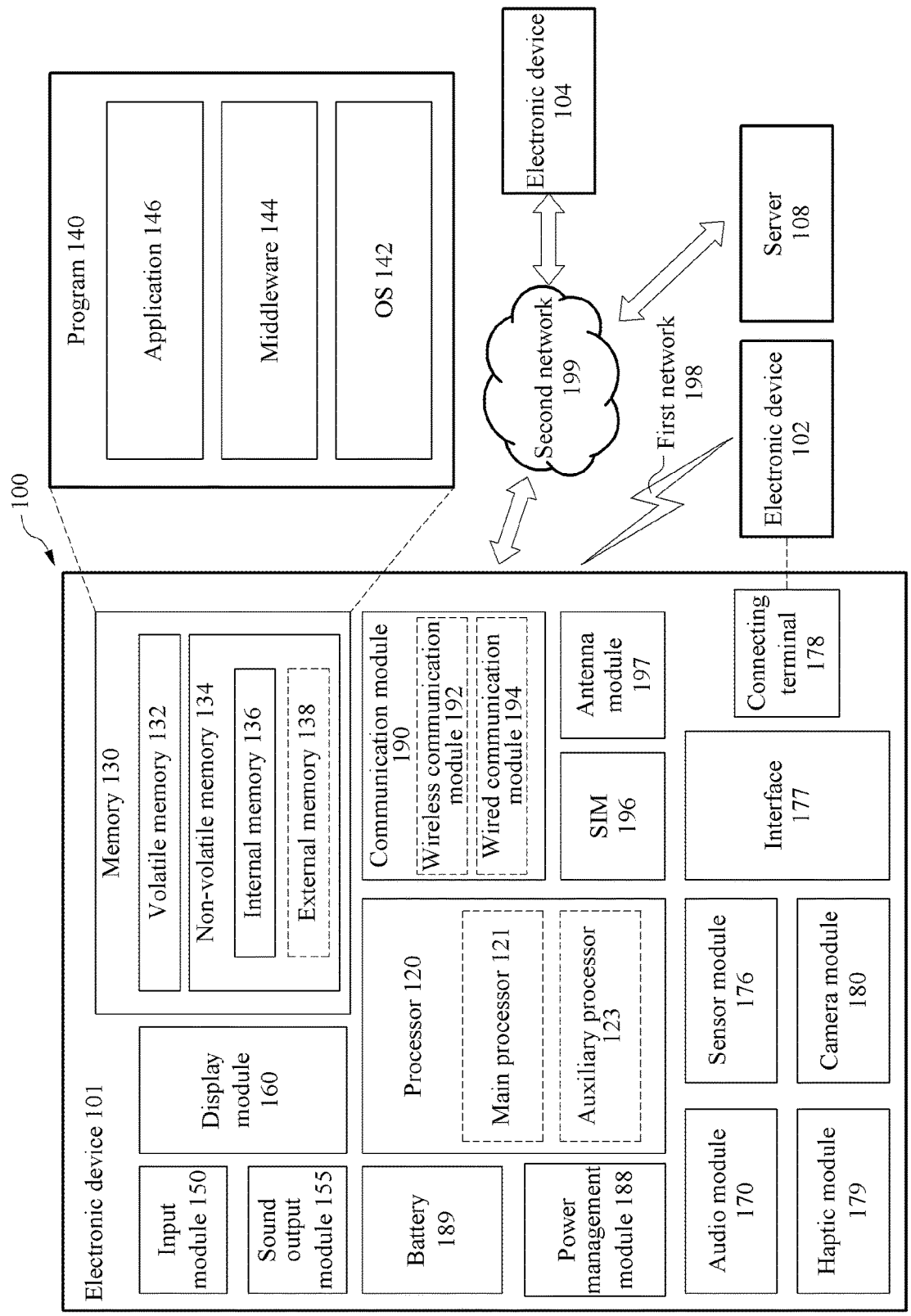
FIG. 1 is a block diagram illustrating an example electronic device in a network environment, according to an embodiment.

Hereinafter, embodiments will be described in detail with reference to the accompanying drawings. When describing the embodiments with reference to the accompanying drawings, like reference numerals refer to like constituent elements and a repeated description related thereto will be omitted.

It should be appreciated that an embodiment of the present disclosure and the terms used therein are not intended to limit the technical features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B", "at least one of A and B", "at least one of A or B", "A, B or C", "at least one of A, B and C", and "at least one of A, B, or C," each of which may include any one of the items listed together in the corresponding one of the phrases, or all possible combinations thereof. Terms such as "$1^{st}$", "$2^{nd}$", "first" or "second" may simply be used to distinguish the component from other components in question, and do not limit the components in other aspects (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wire), wirelessly, or via a third element.

As used in connection with an embodiment of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

An embodiment as set forth herein may be implemented as software (e.g., the program 120) including one or more instructions that are stored in a storage medium (e.g., an internal memory 136 or an external memory 138) that is readable by a machine (e.g., the electronic device). For example, a processor of the machine (e.g., an electronic device) may invoke at least one of the one or more instructions stored in the storage medium and execute it. This allows the machine to be operated to perform at least one function according to the at least one instruction invoked. The one or more instructions may include code generated by a compiler or code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method may be included and provided in a computer program product. The computer program product may be traded as a product between a seller and a buyer. The computer program product may be distributed in the form of a machine-readable storage medium (e.g., compact disc read-only memory (CD-ROM)), or be distributed (e.g., downloaded or uploaded) online via an application store (e.g., PlayStore™), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to an embodiment, each component (e.g., a module or a program) of the above-described components may include a single entity or multiple entities, and some of the multiple entities may be separately disposed in different components. According to an embodiment, one or more of the above-described components may be omitted, or one or more other components may be added. Alternatively or additionally, a plurality of components (e.g., modules or programs) may be integrated into a single component. In such a case, according to an embodiment, the integrated component may still perform one or more functions of each of the plurality of components in the same or similar manner as they are performed by a corresponding one of the plurality of components before the integration. According to an embodiment, operations performed by the module, the program, or another component may be carried out sequentially, in parallel, repeatedly, or heuristically, or one or more of the operations may be executed in a different order or omitted, or one or more other operations may be added.

FIG. 1 is a block diagram illustrating an example electronic device 101 in a network environment 100 according to an embodiment. Referring to FIG. 1, the electronic device 101 in the network environment 100 may communicate with at least one of an electronic device 102 via a first network 198 (e.g., a short-range wireless communication network), or communicate with at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one (e.g., the connecting terminal 178) of the above components may be omitted from the electronic device 101, or one or more other components may be added in the electronic device 101. In various embodiments, some (e.g., the sensor module 176, the camera module 180, or the antenna module 197) of the components may be integrated as a single component (e.g., the display module 160).

The processor 120 may execute, for example, software (e.g., a program 140) to control at least one other component (e.g., a hardware or software component) of the electronic device 101 connected to the processor 120 and may perform various data processing or computation. According to an embodiment, as at least a portion of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with the main processor 121. For example, when the electronic device 101 includes the main processor 121 and the auxiliary processor 123, the auxiliary processor 123 may be adapted to consume less power than the main processor 121 or to be predetermined to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an embodiment, the auxiliary processor 123 (e.g., an ISP or a CP) may be implemented as a portion of another component (e.g., the camera module 180 or the communication module 190) that is functionally related to the auxiliary processor 123. According to an embodiment, the auxiliary processor 123 (e.g., an NPU) may include a hardware structure specified for artificial intelligence (AI) model processing. An AI model may be generated by machine learning. Such learning may be performed by, for example, the electronic device 101 in which artificial intelligence is performed, or performed via a separate server (e.g., the server 108). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may additionally or alternatively include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing record. The receiver may be used to receive an incoming call. According to an embodiment, the receiver may be implemented separately from the speaker or as a part of the speaker.

The display module 160 may visually provide information to the outside (e.g., a user) of the electronic device 101. The display module 160 may include, for example, a control circuit for controlling a display, a hologram device, or a projector and control circuitry to control a corresponding one of the display, the hologram device, and the projector. According to an embodiment, the display device 160 may include a touch sensor adapted to sense a touch, or a pressure sensor adapted to measure an intensity of a force incurred by the touch.

The audio module 170 may convert a sound into an electric signal or vice versa. According to an embodiment, the audio module 170 may obtain the sound via the input module 150 or output the sound via the sound output module 155 or an external electronic device (e.g., an electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101 and generate an electric signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to an embodiment, the haptic module 179 may include, for example, a motor, a piezoelectric element, or an electric stimulator.

The camera module 180 may capture a still image and moving images. According to an embodiment, the camera module 180 may include one or more lenses, image sensors, ISPs, or flashes.

The power management module 188 may manage power supplied to the electronic device 101. According to an embodiment, the power management module 188 may be implemented as, for example, at least a part of a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently of the processor 120 (e.g., an AP) and that support a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN))). These various types of communication modules may be implemented as a single component (e.g., a single chip), or may be implemented as multiple components (e.g., multiple chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to an embodiment, another component (e.g., a radio frequency integrated circuit (RFIC)) other than the radiating element may be additionally formed as a part of the antenna module 197.

According to an embodiment, the antenna module 197 may form a mmWave antenna module. According to an embodiment, the mmWave antenna module may include a PCB, an RFIC disposed on a first surface (e.g., a bottom surface) of the PCB or adjacent to the first surface and capable of supporting a designated a high-frequency band (e.g., the mmWave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 and 104 may be a device of the same type as or a different type from the electronic device 101. According to an embodiment, all or some of operations to be executed by the electronic device 101 may be executed at one or more external electronic devices (e.g., the external electronic devices 102 and 104, and the server 108). For example, if the electronic device 101 needs to perform a function or a service automatically, or in response to a request from a user or another device, the electronic device 101, instead of, or in addition to, executing the function or the service, may request one or more external electronic devices to perform at least part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or MEC. In an embodiment, the external electronic device (e.g., the electronic device 104) may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
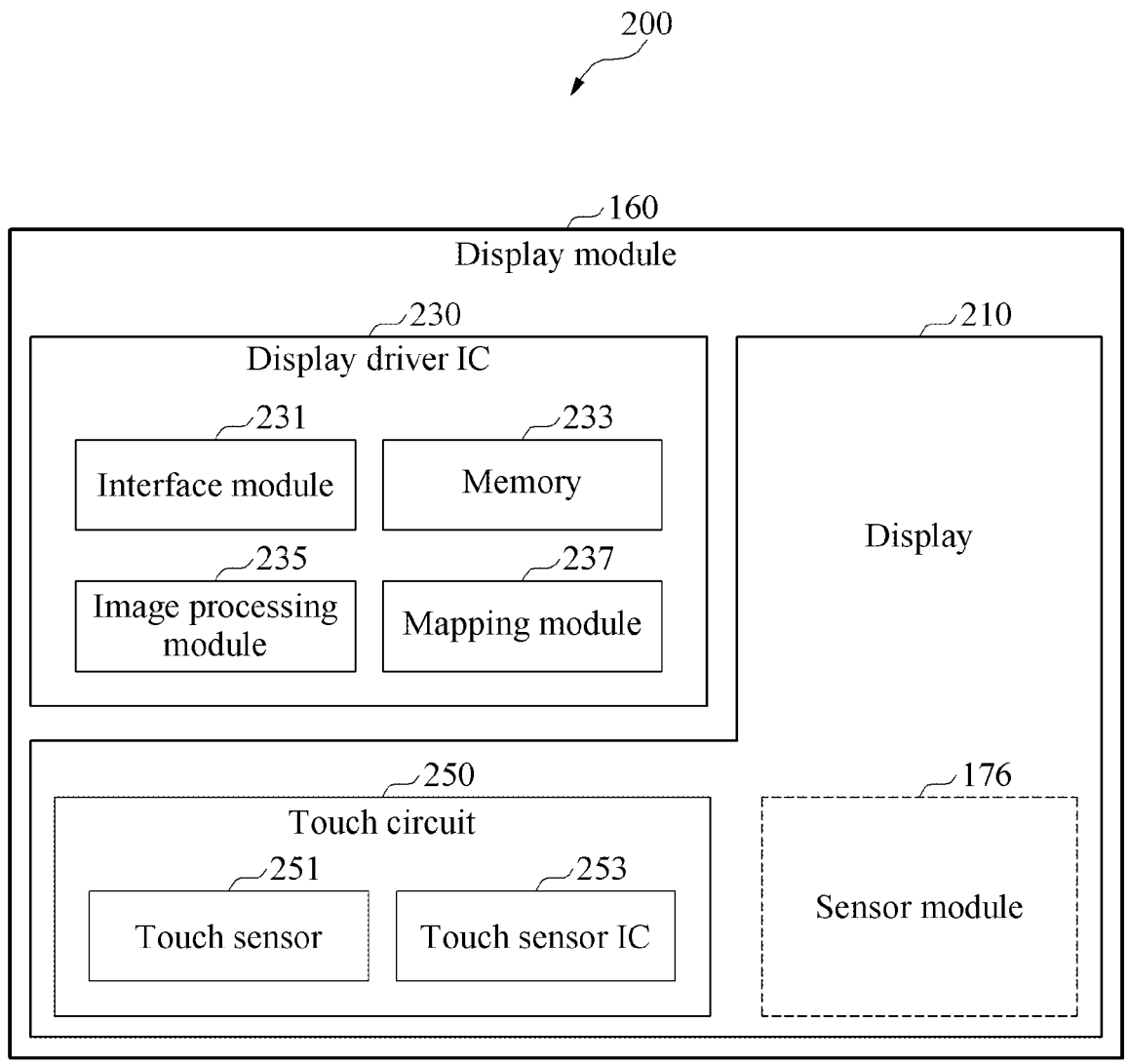
FIG. 2 is a block diagram of an example display module according to an embodiment.

FIG. 2 is a block diagram 200 of an example display module 160 (e.g., the display module 160 of FIG. 1) according to an embodiment.

Referring to FIG. 2, the display module 160 may include a display 210 and a display driver IC (DDI) 230 for controlling the display 210. The DDI 230 may include an interface module 231, a memory 233 (e.g., a buffer memory), an image processing module 235, or a mapping module 237. The DDI 230 may receive, for example, image data or image information including an image control signal corresponding to a command for controlling the image data from other components of an electronic device 101 through the interface module 231 (e.g., including interface module circuitry). For example, according to an embodiment, the image information may be received from a processor 120 (e.g., the main processor 121 (e.g., an application processor) or the auxiliary processor 123 (e.g., an application processor) operated independently from a function of the main processor 121 (e.g., a GPU)). The DDI 230 may communicate with a touch circuit 250 or a sensor module 176 through the interface module 231. Also, the DDI 230 may store at least a portion of the received image information in the memory 233, for example, in units of frames. The image processing module 235 (e.g., including image processing circuitry) may, for example, pre-process or post-process at least a portion of the image data, based on at least a characteristic of the image data or a characteristic of the display 210 (e.g., adjusting resolution, brightness, or size). The mapping module 237 (e.g., including mapping module circuitry) may generate a voltage value or a current value corresponding to the image data pre-processed or post-processed by the image processing module 235. According to an embodiment, the voltage value or the current value may, for example, be generated based on at least some of properties of pixels of the display 210 (e.g., the arrangement of pixels (RGB stripe or pentile structure) or the size of each of the sub-pixels). At least some pixels of the display 210 may, for example, be driven based the voltage value or the current value at least in part, so that visual information (e.g., a text, an image, or an icon) corresponding to the image data may be displayed on the display 210.

According to an embodiment, the display module 160 may further include the touch circuit 250. The touch circuit 250 may include a touch sensor 251 and a touch sensor IC 253 for controlling the touch sensor 251. The touch sensor IC 253 may, for example, control the touch sensor 251 to sense a touch input or a hovering input for a specific position in the display 210. For example, the touch sensor IC 253 may sense a touch input or a hovering input by measuring a change in a signal (e.g., voltage, amount of light, resistance, or quantity of electric charge) for a specific position in the display 210. The touch sensor IC 253 may provide, to the processor 120, information (e.g., location, area, pressure, or time) about the sensed touch input or hovering input. According to an embodiment, at least a part of the touch circuit 250 (e.g., the touch sensor IC 253) may be included as a part of the DDI 230, the display 210, or other components disposed outside the display module 160 (e.g., the auxiliary processor 123).

According to an embodiment, the display module 160 may further include at least one sensor (e.g., a fingerprint sensor, an iris sensor, a pressure sensor, or an illuminance sensor) of the sensor module 176 or a control circuit therefor. In this case, the at least one sensor or the control circuit therefor may be embedded in a part of the display module 160 (e.g., the display 210 or the DDI 230) or a part of the touch circuit 250. For example, when the sensor module 176 embedded in the display module 160 includes a biometric sensor (e.g., a fingerprint sensor), the biometric sensor may obtain biometric information (e.g., a fingerprint image) related to a touch input on a partial area of the display 210. In another example, when the sensor module 176 embedded in the display module 160 includes a pressure sensor, the pressure sensor may acquire pressure information related to a touch input on a part or the entire area of the display 210. According to an embodiment, the touch sensor 251 or the sensor module 176 may be disposed between pixels of a pixel layer of the display 210, or above or below the pixel layer.

Figure 3A:
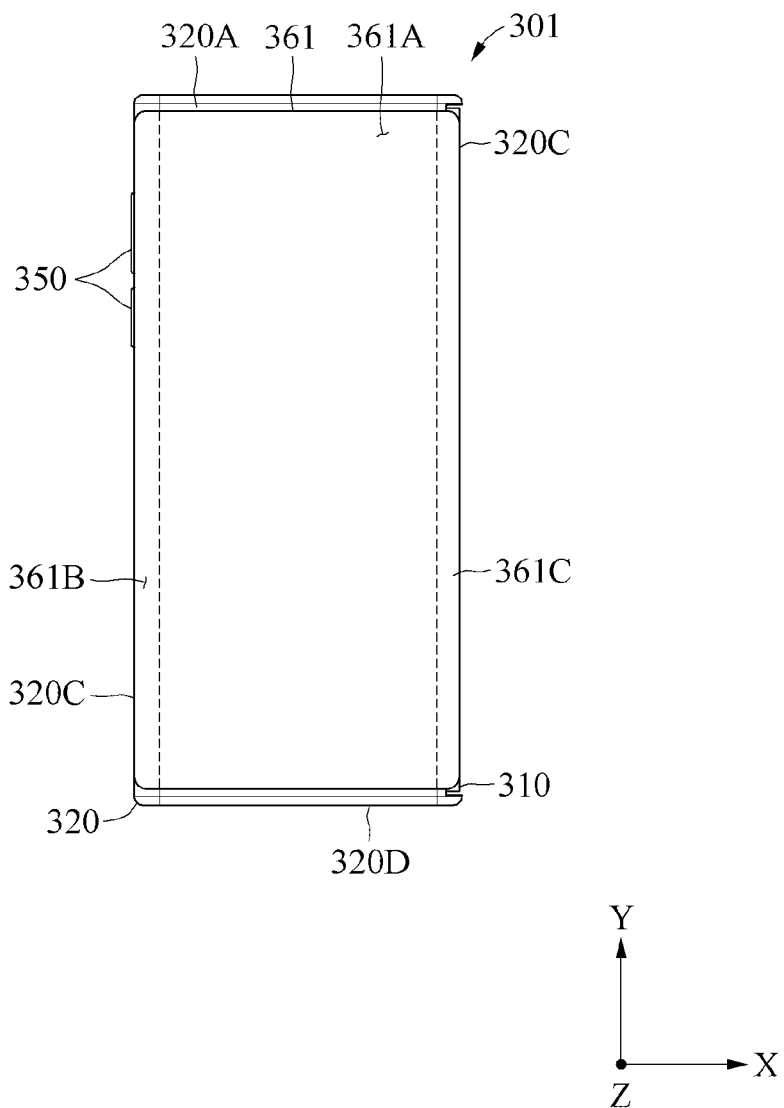
FIG. 3A is a front view of an example electronic device according to an embodiment.
Figure 3B:
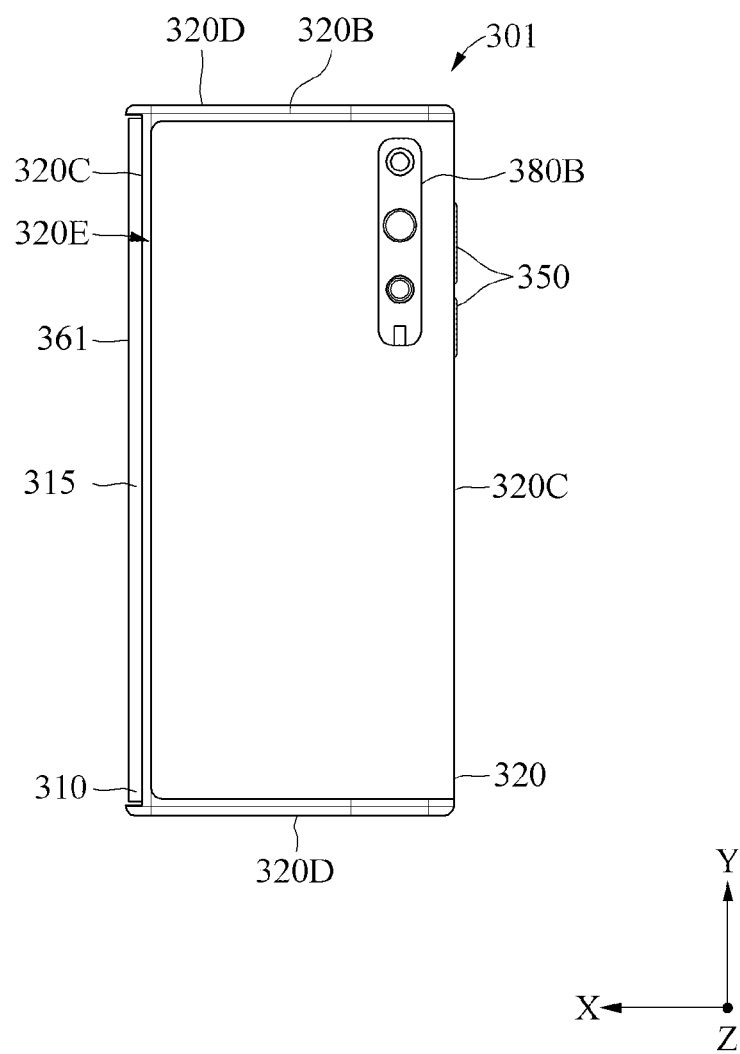
FIG. 3B is a rear view of an example electronic device according to an embodiment.
Figure 3C:
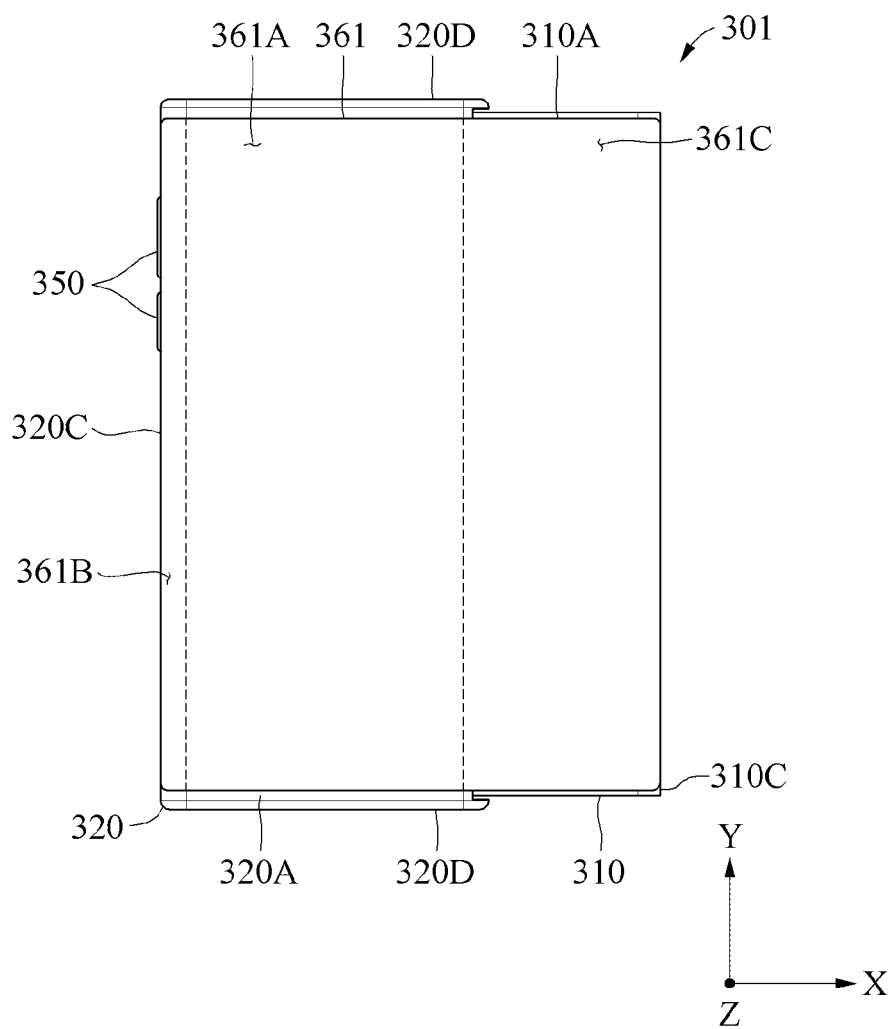
FIG. 3C is another front view of an example electronic device according to an embodiment.
Figure 3D:
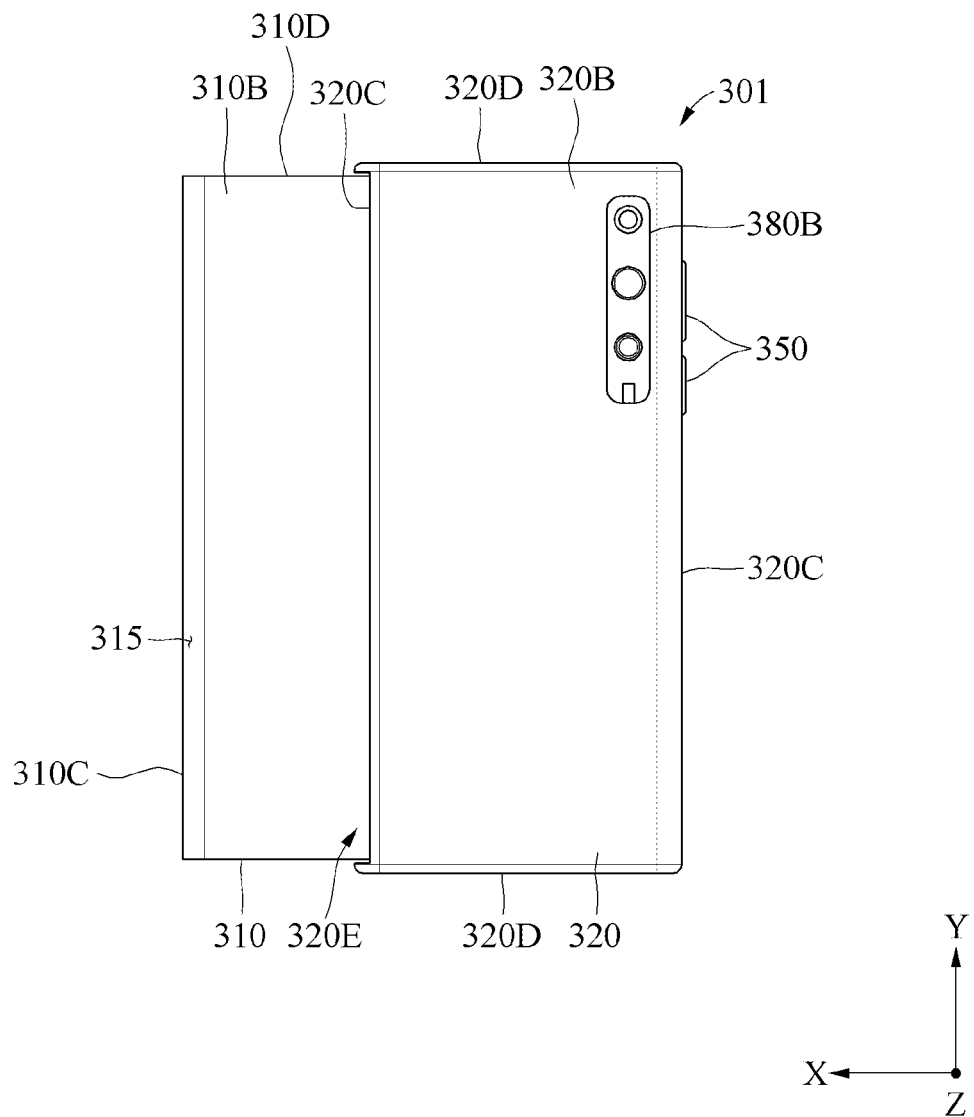
FIG. 3D is another rear view of an example electronic device according to an embodiment.
Figure 3E:
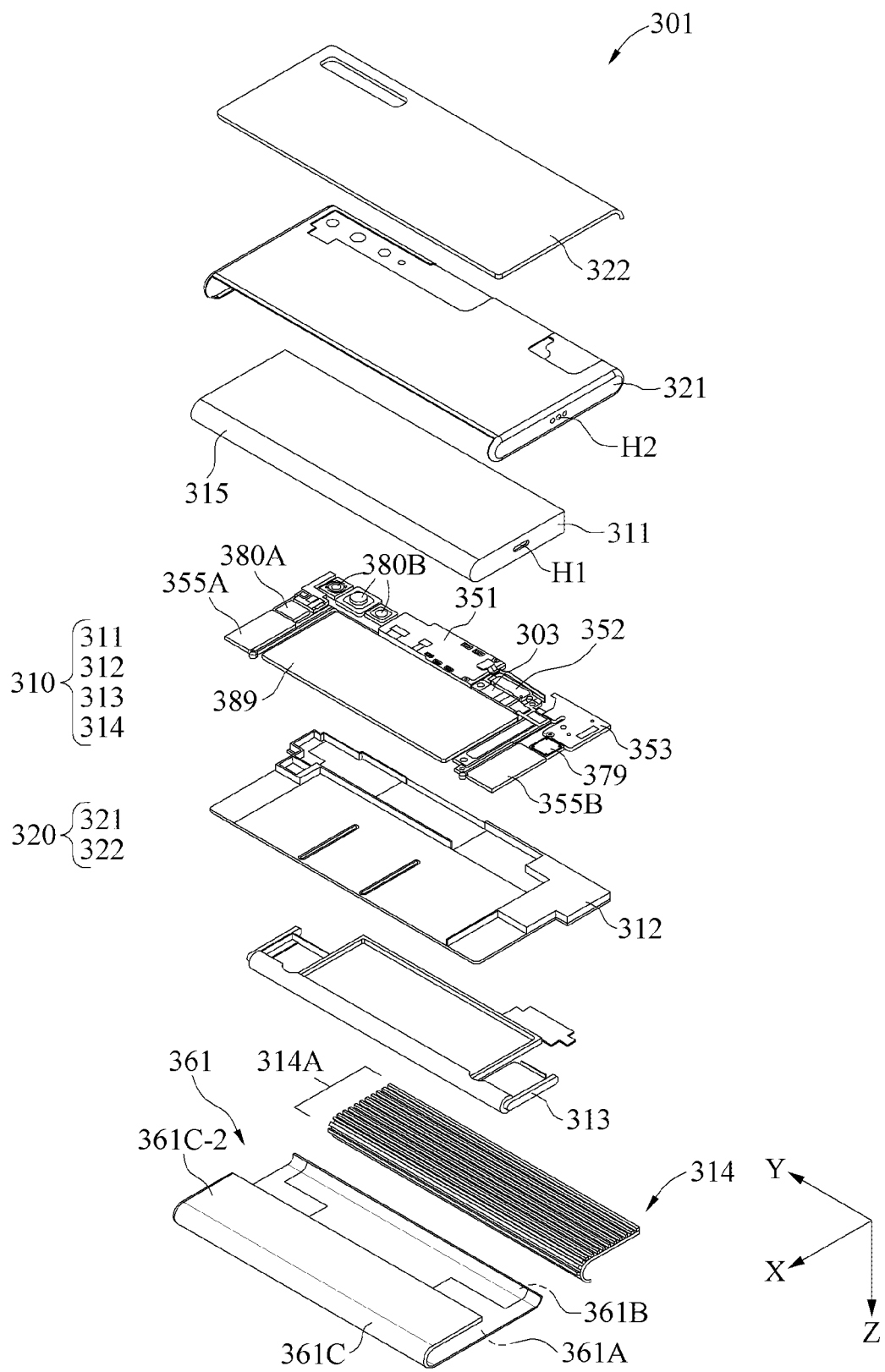
FIG. 3E is an exploded perspective view of an example electronic device according to an embodiment.

FIG. 3A is a front view of an example electronic device 301 according to an embodiment, FIG. 3B is a rear view of the example electronic device 301 according to an embodiment, FIG. 3C is another front view of the example electronic device 301 according to an embodiment, FIG. 3D is another rear view of the example electronic device 301 according to an embodiment, and FIG. 3E is an exploded perspective view of the example electronic device 301 according to an embodiment.

Specifically, FIGS. 3A and 3B are views when the electronic device 301 is in a reduced state and FIGS. 3C and 3D are views when the electronic device 301 is in an expanded state.

Referring to FIGS. 3A, 3B, 3C, 3D, and/or 3E, the electronic device 301 (e.g., the electronic device 101 of FIG. 1) may include housings 310 and 320 configured to form the exterior and accommodate a component inside. The housings may include a first housing 310 and a second housing 320, which are movably coupled to each other.

In an embodiment, the first housing 310 may be slidably coupled to the second housing 320. The first housing 310 may be configured to move relative to the second housing 320 in an expansion direction (e.g., the +X direction) or move relative to the second housing 320 in a reduction direction (e.g., the −x direction) opposite to the expansion direction. Moreover, although in an embodiment of the present disclosure the first housing 310 moves relative to the second housing 320, the present disclosure is not limited thereto and the second housing 320 may slide relative to the first housing 310.

According to an embodiment, the first housing 310 may include a first surface 310A (e.g., a first front surface), a second surface 310B (e.g., a second rear surface) opposite to the first surface 310A, a plurality (e.g., two) of first side surfaces 310C (e.g., a first left side surface and a first right side surface) oriented in a direction (e.g., the +/−X direction) and between the first surface 310A and the second surface 310B, and a plurality (e.g., two) of second side surfaces 310D (e.g., a first upper side surface and a first lower side surface) oriented in another direction (e.g., the +/−Y direction) intersecting with the direction (e.g., the +/−X direction) and between the second surface 310A and the second surface 310B.

According to an embodiment, the plurality of first side surfaces 310C may be formed into round surfaces. The first housing 310 may include at least one first hole H1 formed in the second side surface 310D (e.g., the first lower side surface) oriented in a direction (e.g., the −Y direction) among the second side surfaces 310D.

In an embodiment, the first housing 310 may include a display cover 315. The display cover 315 may be provided in an area in which a portion (e.g., a third area 361C) of a display 361 is inserted into or drawn out from the inner space formed between the first housing 310 and the second housing 320. In an embodiment, the display cover 315 may cover a partial bent region of the display 361, reduce damage to the display 361 by an external impact, and reduce the inflow of foreign materials into the inner space between the first housing 310 and the second housing 320.

According to an embodiment, the second housing 320 may include a third surface 320A (e.g., a second front surface), a fourth surface 320B (e.g., a second rear surface) opposite to the third surface 320A, a plurality (e.g., two) of third side surfaces 320C (e.g., a second left side surface and a second right side surface) oriented in a direction (e.g., the +/−X direction) and between the third surface 320A and the fourth surface 320B, and a plurality (e.g., two) of fourth side surfaces 320D (e.g., a second upper side surface and a second lower side surface) oriented in another direction (e.g., the +/−Y direction) intersecting with the direction (e.g., the +/−X direction) and between the third surface 320A and the fourth surface 320B. Among the plurality of third side surfaces 320C, a third side surface 320C oriented in one direction (e.g., the +X direction) may include an open portion 320E that is at least partially open. In an embodiment, the plurality of third side surfaces 320C may be formed into round surfaces. The second housing 320 may include at least one second hole H2 formed in the fourth side surface 320D (e.g., the second lower side surface) oriented in a direction (e.g., the −Y direction) among the plurality of fourth side surfaces 320D. The second hole H2 may be aligned, for example, with the first hole H1.

In an embodiment, the electronic device 301 may include a display 361 (e.g., the display module 160 of FIG. 1 and FIG. 2) including screen display areas 361A, 361B, and 361C. In an embodiment, the display 361 may be one of a flexible display, a foldable display, or a rollable display.

In an embodiment, the screen display areas 361A, 361B, and 361C may include a first area 361A on the first surface 310A and the third surface 320A, a second area 361B on the third side surface 320C oriented in one direction (e.g., the −X direction) of the third side surfaces 320C, and a third area 361C on the third side surface 320C oriented in the other direction (e.g., the +X direction) of the third side surfaces 320C and surrounding at least partially an open portion 320E. In an embodiment, the second area 361B and the third area 361C of the display 361 may comprise curved round surfaces.

In an embodiment, the second area 361B may be partially on the first surface 310A and the third surface 320A. In an embodiment, the third area 361C may be partially on the first surface 310A and the third surface 320A. In an embodiment, the third area 361C may be partially on the second surface 310B and the fourth surface 320B.

In an embodiment, the display 361 may be configured to partially display a screen. For example, the display 361 may display a screen on the first area 361A positioned on the first surface 310A and the third surface 320A and display a screen on the second area 361B and/or the third area 361C at different points in time from those of the first area 361A. In an embodiment, the screen display area of the display 361 may expand or reduce as the first housing 310 moves in the expansion direction and the reduction direction.

In an embodiment, the second area 361B may generate a separate side display distinguished from the first area 361A, or the second area 361B may expand the screen display area of the first area 361A. The second area 361B may receive an input of a gesture, which is different from a gesture in other areas.

When viewed from a direction (e.g., the −Z direction), the electronic device 301 may change in shape between a first shape (e.g., a reduced state, the shape of FIG. 3A) comprising the screen display area (e.g., the first area 361A, the second area 361B, and the third area 361C) of a first size and a second shape (e.g., an expanded state, the shape of FIG. 3C) comprising the screen display area (e.g., the first area 361A, the second area 361B, and the third area 361C) larger than the first size.

For example, when the first housing 310 moves relative to the second housing 320 in the expansion direction (e.g., the +X direction) in the first shape, the third area 361C may be drawn out from the inner space between the first housing 310 and the second housing 320. As an area exposed to the outside of the third area 361C increases, the size of the third area 361C in the inner space between the first housing 310 and the second housing 320 decreases, expanding the size of the screen display area of the electronic device 301, For example, when the first housing 310 moves relative to the second housing 320 in the reduction direction (e.g., −X direction) opposite to the expansion direction in the second shape, the third area 361C may be inserted into the inner space between the first housing 310 and the second housing 320. As the area exposed to the outside of the third area 361C decreases, the size of the third area 361C in the inner space between the first housing 310 and the second housing 320 increases, reducing the screen display area of the electronic device 301. While the electronic device 301 is changing in shape between the first shape and the second shape, the size of the first area 361A and the size of the second area 361B may be substantially constant.

In an embodiment, the electronic device 301 may include a slide device 303 configured to move the first housing 310 and the second housing 320 relative to each other. The slide device 303 may connect to the first housing 310 and the second housing 320 and may slide one of the first housing 310 and the second housing 320 relative to the other housing 310 or 320. As the first housing 310 or the second housing 320 moves, the display may expand or reduce.

In an embodiment, the electronic device 301 may include an input module 350 (e.g., the input module 150 of FIG. 1). The input module 350 may be, for example, formed on the third side surface 320C (e.g., the second left side surface) where the open portion 320E is not formed among the plurality of third side surfaces 320C.

The electronic device 301 may include a first sound output module 355A (e.g., the sound output module 155 of FIG. 1) and a second sound output module 355B (e.g., the sound output module 155 of FIG. 1). In an embodiment, the first sound output module 355A may be on a first portion (e.g., an upper portion) of the first housing 310 and the second sound output module 355B may be on a second portion (e.g., a lower portion) of the first housing 310, wherein the second portion is different from the first portion.

For example, in the first shape (e.g., the reduced state of the electronic device 301 of FIG. 3A), the first sound output module 355A may be configured to function as a transmitter/receiver and the second sound output module 355B may be configured to function as a speaker, whereas in the second shape (e.g., the expanded state of the electronic device 301 of FIG. 3C), the first sound output module 355A and the second sound output module 355B may be configured to function as a speaker. In an example, in the second shape, the first sound output module 355A together with the second sound output module 355B may output stereo sound.

In an embodiment, in the first shape, the second sound output module 355B may be configured to emit sound through the first hole H1 and the second hole H2 substantially aligned with each other, and in the second shape, the second sound output module 355B may be configured to emit sound through the first hole H1. In an embodiment, at least one of the first sound output module 355A and the second sound output module 355B may be in the second housing 320. In an embodiment, the electronic device 301 may include only one of the first sound output module 355A and the second sound output module 355B or may further include an additional sound output module to the shown sound output modules.

In an embodiment, the electronic device 301 may include a haptic module 379 (e.g., the haptic module 179 of FIG. 1). The haptic module 379 may include, for example, a vibrator configured to generate vibrations. In an embodiment, the haptic module 379 may be in the second housing 320. In an embodiment, the haptic module 379 may be adjacent to the second sound output module 355B. In an embodiment, the haptic module 379 may be in the first housing 310.

In an embodiment, the electronic device 301 may include a first camera module 380A (e.g., the camera module 180 of FIG. 1) and a second camera module 380B (e.g., the camera module 180 of FIG. 1). The first camera module 380A may be configured to obtain an image in one direction (e.g., the +Z direction) of the electronic device 301, and the second camera module 380B may be configured to obtain an image in the other direction (e.g., the −Z direction) of the electronic device 301.

In an embodiment, the first camera module 380A and the second camera module 380B may be in the second housing 320. In an embodiment, at least one of the first camera module 380A and the second camera module 380B may be in the first housing 310. In an embodiment, the electronic device 301 may include only one of the first camera module 380A and the second camera module 380B or may further include an additional camera module to the shown camera modules.

In an embodiment, the electronic device 301 may include a battery 389 (e.g., the battery 189 of FIG. 1). In an embodiment, the battery 389 may be in the first housing 310. The battery 389 may be at least partially enclosed by, for example, the first sound output module 355A, the first camera module 380A, the second camera module 380B, a first PCB 351, the slide device 303, a third PCB 353, the haptic module 379, and the second sound output module 355B. In an embodiment, the battery 389 may be in the second housing 320.

In an embodiment, the electronic device 301 may include the first PCB 351, a second PCB 352, and the third PCB 353. The first PCB 351, the second PCB 352, and the third PCB 353 may include a plurality of metal layers and a plurality of dielectrics each between two of the adjacent metal layers. In an embodiment, the first PCB 351 may be in the second housing 320. The first PCB 351 may include electronic components (e.g., the power management module 188 of FIG. 1). The second PCB 352 may be in the first housing 310. For example, the second PCB 352 may electrically connect to the slide device 303. The third PCB 353 may be in the second housing 320. For example, the third PCB 353 may electrically connect to the haptic module 379.

In an embodiment, the electronic device 301 may include the housings 310 and 320. Specifically, the electronic device 301 may include a first cover 311, a first plate 312, a second plate 313, and a support structure 314, and the first cover 311, the first plate 312, the second plate 313, and the support structure 314 may form the first housing 310. The electronic device 301 may include a second cover 321 and a third plate 322. The second cover 321 may include a display cover 315, and the second cover 321 and the third plate 322 may form the second housing 320.

The first cover 311 may at least partially enclose the first sound output module 355A, the first camera module 380A, the haptic module 379, and the second sound output module 355B. The first plate 312 may at least partially accommodate electronic components (e.g., the slide device 303, the first sound output module 355A, the second sound output module 355B, the first camera module 380A, the second camera module 380B, the first PCB 351, the second PCB 352, the third PCB 353, the haptic module 379, and other electronic components). The second plate 313 may be between the first plate 312 and the display 361 to support the slide device 303 and the display 361.

In an embodiment, the support structure 314 may include a plurality of support bars 314A configured to be flexibly bent and to support the display 361. The second cover 321 may couple to the first cover 311 to at least partially enclose the first cover 311, and the first cover 311 may slide relative to the second cover 321.

In an embodiment, the second cover 321 may be configured to guide a plurality of support bars 314A. The second cover 321 may expose at least a portion (e.g., the second camera module 380B) of the electronic components to the outside of the electronic device 301. The third plate 322 may enclose at least a portion of the second cover 321. The third plate 322 may be formed of, for example, glass. The structures of the first housing 310 and the second housing 320 described herein are not limited to the shown embodiments and may be other types of structures.

Figure 4A:
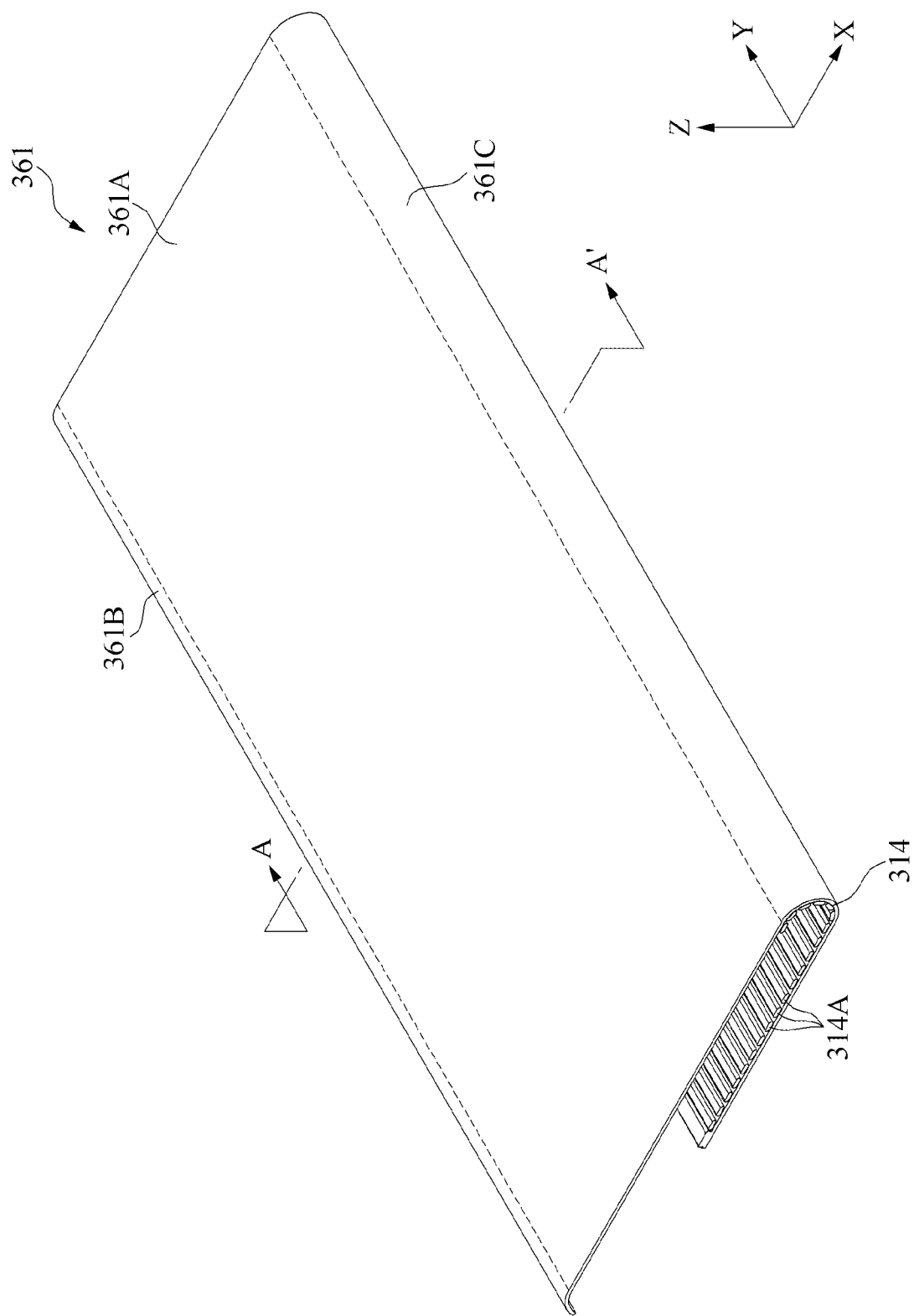
FIG. 4A is an exploded perspective view of an example display according to an embodiment.
Figure 4B:
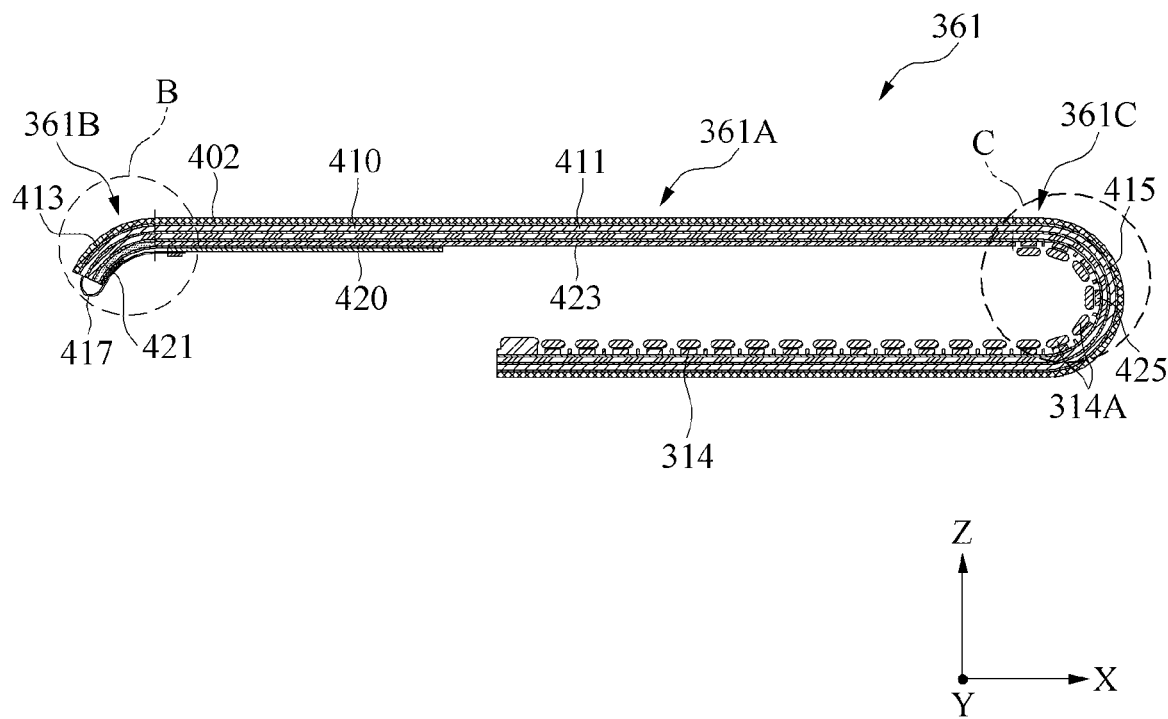
FIG. 4B is a cross-sectional view of an example display according to an embodiment.

FIG. 4A is a perspective view of an example display 361 according to an embodiment, and FIG. 4B is a cross-sectional view of the exampledisplay 361 according to an embodiment. Specifically, FIG. 4B is a cross-sectional view of the display 361 in one direction (e.g., the +Y direction) according to line A-A' shown in FIG. 4A.

Referring to FIGS. 4A and 4B, the display 361 according to an embodiment may include at least a portion of a cover layer 402, a display panel 410, and a lattice plate 420.

In an embodiment, the display 361 of an electronic device 301 may comprise a multi-layered structure in which a plurality of layers is overlapped. In an embodiment, the display 361 may include at least a portion of a cover layer 402 that is visually exposed to the outside of an electronic device (e.g., the electronic device 301 of FIGS. 3A to 3E), the display panel 410 connecting to one surface (e.g., a rear surface) of the cover layer 402 and outputting a screen, and the lattice plate 420 connecting to one surface (e.g., a rear surface) of the display panel 410 and supporting the display panel 410.

In an embodiment, the display 361 may include a first area 361A, a second area 361B, and a third area 361C that are partitioned by various factors such as a position, a curvature, or an expansion or no expansion.

For example, the first area 361A may be a flat area that mainly forms a screen display area and has a substantially flat surface. The second area 361B may be an edge area connecting to one end portion of the first area 361A and comprising at least a partial region which is curved. The third area 361C may be a rollable area connecting to the other end portion of the first area 361A opposite to the second area 361B and comprising at least a partial region which bends according to the movement of a first housing (e.g., the first housing 310 of FIGS. 3A to 3E) or a second housing (e.g., the second housing 320 of FIGS. 3A to 3E).

In an embodiment, the second area 361B may connect to one end portion of the first area 361A in one direction (e.g., the −X direction) and comprise at least a partial region covered by the second housing 320. The third area 361C may connect to one end portion of the first area 361A in the other direction (e.g., the +X direction) and may be bendable in a direction surrounding the first housing 310.

In an embodiment, in the display panel 410, the size of a screen display area visually exposed to the outside may change depending on the movement of the first housing 310 relative to the second housing 320. The display panel 410 may include a plurality of light emitting devices (not shown) to emit light of various colors in units of pixels or sub-pixels, which collectively displays the screen of the electronic device 301.

In an embodiment, the display panel 410 may include a plurality of portions 411, 413, and 415 that are divided by their corresponding positions connecting to the display 361. In an embodiment, a flat portion 411 of the display panel 410 may correspond to the first area 361A of the display 361 and form a screen display area of a substantially flat surface. In an embodiment, an edge portion 413 of the display panel 410 may correspond to the second area 361B of the display 361B, connect to one end portion of the flat portion 411, and comprise at least a partial region which is curved.

In an embodiment, a bending portion 415 of the display panel 410 may correspond to the third area 361C of the display 361, connect to the other end portion of the flat portion 411 opposite to the edge portion 413, and comprise at least a partial region which is bendable along the movement of the first housing 310 relative to the second housing 320.

For example, as illustrated in FIGS. 3A to 3E, the electronic device 301 may include the display 361, which may be rollable to expand or reduce the screen display area as the first housing 310 moves relative to the second housing 320. In an embodiment, the bending portion 415 of the display panel 410 may be a partial region, which is drawn out from or inserted into the inner space between the first housing 310 and the second housing 320 of the electronic device 301 as the electronic device 301 moves between the reduced state (e.g., the first shape of FIG. 3A) and the expanded state (e.g., the second shape of FIG. 3C).

In another example, although not shown in the drawings, the electronic device 301 may include the display 361, which is foldable to expand or reduce the screen display area as one housing (not shown) moves relative to the other housing (not shown) with respect to a hinge unit (not shown). In an embodiment, the bending portion 415 of the display panel 410 may be a portion in which the hinge unit (not shown) of the electronic device 301 is located and a portion in which the flat portion 411 of the display panel 410 folds to face the other portion of the flat portion 411. Hereinafter, various embodiments herein are described mainly based on an electronic device 301 including a display 361, which is rollable. However, an actual implementation is not limited thereto, and various implementations of the present disclosure may apply to an electronic device 301 including a display 361, which is foldable, or other types of displays 361.

In an embodiment, the display panel 410 may further include a folding portion 417, which connects to the edge portion 413 opposite to the flat portion 411 and has at least a folded portion.

In an embodiment, the lattice plate 420 may be on the rear surface of the display panel 410 to support the display panel 410. In an embodiment, the lattice plate 420 may be a support sheet having rigidity to support the display panel 410. A lattice pattern (e.g., the first lattice pattern P1 or the second lattice pattern P2 of FIG. 6) may be formed by a lattice hole (e.g., a first lattice hole 422 or a second lattice hole 426 of FIG. 6) in at least a portion of the lattice plate 420 to provide flexibility to the display panel 410. In an embodiment, the lattice plate 420 may include a plurality of portions respectively corresponding to positions connected to the display 361 or the display panel 410. A first lattice portion 421, a second lattice portion 425, and a central portion 423 of the lattice plate 420 according to an embodiment are described with reference to FIG. 6.

In an embodiment, the plurality of support bars 314A of the support structure 314 may be connected to the rear surface of the second lattice portion 425 of the lattice plate 420. The plurality of support bars 314A may support the second lattice portion 425 and the bending portion 415 to be bendable and may be spaced apart from each other to provide flexibility to the lattice plate 420.

Figure 5A:
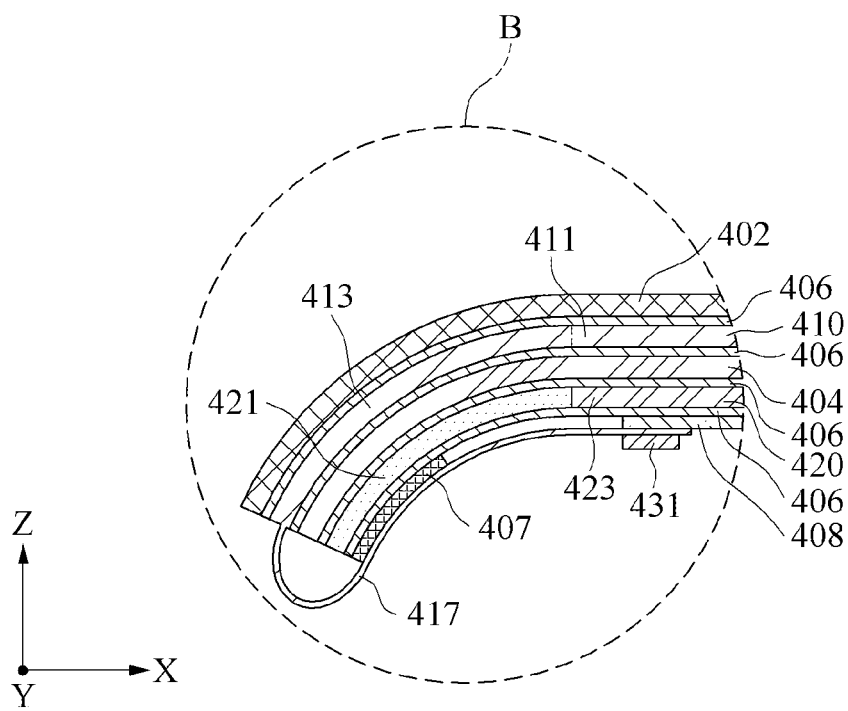
FIG. 5A is a cross-sectional view of a partial region of an example display, according to an embodiment.
Figure 5B:
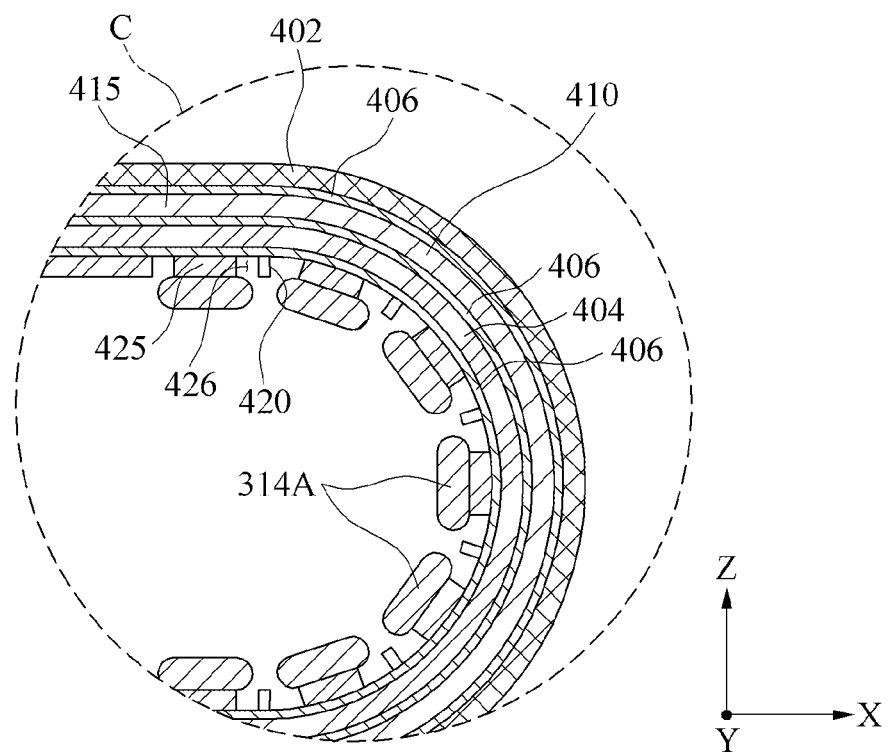
FIG. 5B is another cross-sectional view of a partial area of an example display, according to an embodiment.

FIGS. 5A and 5B are cross-sectional views of partial regions of an example display 361, according to various embodiments.

Specifically, FIG. 5A is an enlarged cross-sectional view of area B of the display 361 of FIG. 4B and FIG. 5B is an enlarged cross-sectional view of area C of the display 361 of FIG. 4B. Although FIGS. 5A and 5B are multi-layer structures schematically illustrating some of a plurality of components included in the display 361 in order to explain the multi-layer structures of the display 361, an actual implementation is not limited thereto.

Referring to FIGS. 5A and 5B, the display 361 according to an embodiment may comprise a multi-layer structure in which at least some of a cover layer 402, a display panel 410, a support layer 404, and a lattice plate 420 are stacked.

In an embodiment, the cover layer 402 may be disposed on one surface (e.g., the surface or the front surface) of the display panel 410. The cover layer 402 may include a transparent material via which light emitted from the display panel 410 passes and that may protect the display panel 410. In an embodiment, the cover layer 402 may include a transparent glass material and a material having a high hardness. For example, the cover layer 402 may be formed as a stack including an outer coating layer, a window layer, and a damping layer.

Hereinafter, for convenience of explanation, one surface facing the cover layer 402 with respect to the display panel 410 is referred to as a 'surface' and the other side facing the support layer 404 with respect to the display panel 410 is referred to as a 'rear surface'.

In an embodiment, the support layer 404 may be disposed on the rear surface of the display panel 410, which is the other surface opposite to the cover layer 402. The support layer 404 may relieve an impact on the display panel 410 from the outside and improve the touch sensitivity of the display panel 410. The support layer 404 may include at least a portion of thermoplastic polyurethane (TPU), poly urethane (PU), polyethylene terephthalate (PET), acryl, or polyimide (PI).

In an embodiment, an adhesive member 406 may be a pressure sensitive adhesive (PSA) and connect a plurality of layers included in the display 361 to be fixed to each other. Although not shown in the drawings, the display 361 may further include other layers, such as a polarizing panel (not shown) and a touchscreen panel (not shown).

In an embodiment, the folding portion 417 may be folded such that at least a portion of the folding portion 417 may overlap a portion of the edge portion 413 and the flat portion 411 of the display panel 410 when the screen display area of the display 361 is viewed.

In an embodiment, the folding portion 417 may be continuously linked from the edge part 413 of the display panel 410. Alternatively, the folding portion 417 may be a connection member connecting to the display panel 410 to supply power and/or an electrical signal to the display panel 410.

In an embodiment, an IC circuit 431 may be disposed on the folding part 417. The IC circuit 431 may be an electronic device for controlling the display panel 410 and electrically connect to a processor (e.g., the processor 120 of FIG. 1) and/or an FPCB 408 to transmit and receive an electrical signal. The IC circuit 431 may be attached to a surface of the folding portion 417 facing the rear direction of the display 361 and substantially to an extension surface of the display panel 410.

In an embodiment, a plurality of support bars 314A of a support structure (e.g., the support structure 314 of FIG. 3E) may be disposed on the rear surface of the second lattice portion 425. The plurality of support bars 314A may be spaced apart from each other in both lateral directions (e.g., +/−X directions) of the display panel 410. The plurality of support bars 314A may supplement hardness of the second lattice portion 425 and support the bending portion 415 and the second lattice portion 425 corresponding to the third area 361C to prevent deformation or damage according to a rolling operation of the third area 361C.

In an embodiment, a spacer 407 may be disposed on the rear surface of the first lattice portion 421. The spacer 407 may be between one surface of the folding portion 417 and the first lattice portion 421 and support the folding portion 417. The FPCB 408 may be disposed on the rear surface of the central portion 423. The FPCB 408 may connect to the display panel 410 and receive, from the processor 120, a signal for controlling the display panel 410 or a signal for controlling the display panel 410 with the IC circuit 431.

In an embodiment, a boundary between the first lattice portion 421 and the central portion 423 may be at the edge portion 413 or the flat portion 411. In an embodiment, the first lattice portion 421 may be disposed to face the rear surface of some of the edge portion 413 and the flat portion 411, and the central portion 423 may be disposed to face the rear surface of the remaining parts of the flat portion 411. For example, at least a portion of the first lattice portion 421 may be disposed on the rear surface of the flat portion 411, and the first lattice portion 421 may not overlap the central portion 423, based on a state in which a surface of the flat portion 411 is viewed.

In an embodiment, the flexibility of the first lattice portion 421 may be greater than the flexibility of the central portion 423 as the first lattice portion 421 has a relatively lower modulus than the central portion 423, thus reducing deformation or damage by an external force, which is generated at a joint area of the edge portion 413 and the flat portion 411, and a restoration force of the display panel 410.

In an embodiment, a modulus of the first lattice portion 421 may be different from that of the central portion 423 and/or that of the second lattice portion 425, and the first lattice portion 421 may be made of (or include) a material different from that of the central portion 423 and/or the second lattice portion 425. For example, the second lattice portion 425 may be made of (or include) a material having a relatively higher modulus than the first lattice portion 421 so that the second lattice portion 425 has a relatively higher modulus than the first lattice portion 421. Alternatively, for example, the first lattice portion 421 may be made of (or include) a material having a relatively lower modulus than the central portion 423 and/or the second lattice portion 425. However, the present disclosure is not limited thereto, and the first lattice portion 421 may be made of (or include) a material substantially the same as or similar to that of the central portion 423 and/or that of the second lattice portion 425, and a difference in modulus among the first lattice portion 421, the central portion 423, and the second lattice portion 425 may be implemented by a structural difference.

In an embodiment, the first lattice portion 421 may include at least one of a polyurethane (PU), a thermoplastic polyurethane (TPU), and an acrylic (acryl) material and the central portion 423 may include at least one of high-molecular compounds with a relatively high rigidity, such as metal, glass, or plastic.

In an embodiment, the central portion 423 may comprise a substantially flat surface corresponding to the flat portion 411 and a relatively small resistance for a stress due to the curved structure In an embodiment, the second lattice portion 425 may be formed to have a longer horizontal length than the first lattice portion 421, thus distributing a resistance more widely than the first lattice portion 421. Alternatively, the second lattice portion 425 may connect to a separate support structure (e.g., the support structure 314 of FIG. 3E) to be rollable, thus reinforcing rigidity and providing flexibility.

In an embodiment, the first lattice portion 421 may be formed short in a horizontal direction (e.g., +/−X direction) corresponding to the edge portion 413 and have a higher resistance than the other portions 423 and 425.

In an embodiment, the first lattice portion 421 may be made of (or include) a material having a lower modulus than the central portion 423 and/or the second lattice portion 425 and may reduce a resistance for a stress caused by a curved structure and deformation or lifting caused by the resistance.

Figure 6:
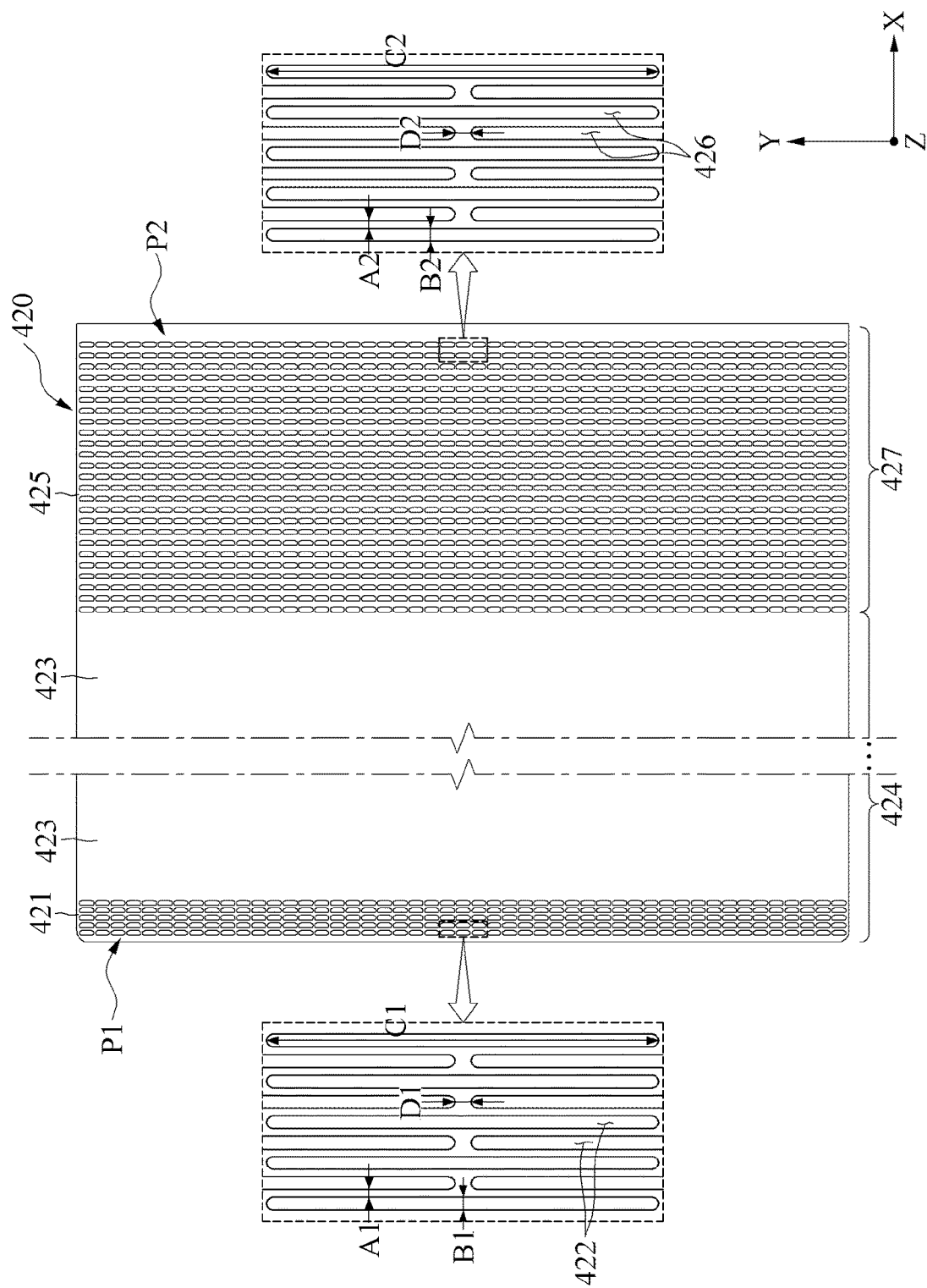
FIG. 6 is a front view of an example lattice plate according to an embodiment.

FIG. 6 is a front view of an example lattice plate 420 according to an embodiment. Specifically, FIG. 6 illustrates a state in which the lattice plate 420 is flatly unfolded in one flat direction (e.g., an X-Y flat direction) with respect to a central portion 423.

Referring to FIG. 6, the lattice plate 420 according to an embodiment may include at least some of a first lattice portion 421, a second lattice portion 425, and a central portion 423.

In an embodiment, the lattice plate 420 may connect to one surface of a display panel (e.g., the display panel 410 of FIGS. 4A and 4B) of a foldable or rollable display (e.g., the display 361 of FIGS. 4A and 4B) to provide flexibility to the display panel 410 and to reinforce rigidity of the display 361. In an embodiment, the lattice plate 420 may be a metal plate, a rollable plate, a foldable plate, or a bendable plate. In an embodiment, the lattice plate 420 may include at least some of a metal material, a polymer compound, or carbon fiber reinforced plastics (CFRP).

In an embodiment, the central portion 423 may connect to one surface of a flat portion 411 of the display panel 410. In an embodiment, the central portion 423 may be at the center between the first lattice portion 421 and the second lattice portion 425 based on both directions (e.g., the +/−X directions) in which a screen display area of the display 361 expands or reduces.

In an embodiment, the central portion 423 may be a portion of the lattice plate 420, in which lattice holes 422 and 426 are not formed and an area for reinforcing the rigidity of the flat portion 411. The central portion 423 may be made of a material having rigidity to support the flat portion 411. In an embodiment, the central portion 423 may reduce a phenomenon in which a screen of the display 361 sinks or bends and may improve a touch texture.

In an embodiment, at least some of the lattice plate 420 (e.g., the first lattice portion 421 or the second lattice portion 425) may include a plurality of lattice holes 422 and 426.

The plurality of lattice holes 422 and 426 may be formed by penetrating the lattice plate 420 in a direction from one surface facing the display panel 410 to the other surface. Lattice patterns P1 or P2 may be formed as the plurality of lattice holes 422 and 426 that are apart from each other by a predetermined interval. In an embodiment, each shape of the plurality of lattice holes 422 and 426 may be substantially a circle or an ellipse shape but is not limited thereto and may be a polygonal shape or a geometric shape of various structures.

In an embodiment, the first lattice portion 421 may be disposed on one surface of the edge portion 413 of the display panel 410. The first lattice portion 421 may supplement the flexibility of the edge portion 413. The first lattice portion 421 may include a first lattice pattern P1 and the plurality of first lattice holes 422 that are arranged to form the first lattice pattern P1.

In an embodiment, the first lattice portion 421 may be implemented as a single body with the central portion 423 and made of substantially the same material as that of the central portion 423. However, the disclosure is not limited in this respect, and the first lattice portion 421 may be made of or include a material different from that of the central portion 423 and be joined to the central portion 423.

In an embodiment, the second lattice portion 425 may be disposed on one surface of a bending portion 415 of the display panel 410. The second lattice portion 425 may supplement the flexibility of the bending portion 415. The second lattice portion 425 may include a second lattice pattern P2 and include the plurality of second lattice holes 426 that are arranged to form the second lattice pattern P2.

In an embodiment, the second lattice portion 425 may be implemented as a single body with the central portion 423 and made of substantially the same material as the central portion 423. However, the disclosure is not limited in this respect, and the second lattice portion 425 may be formed of or include a material different from that of the central portion 423 and be joined to the central portion 423. In an embodiment, the second lattice portion 425 may be made of a material substantially the same as or similar to the first lattice portion 421.

In an embodiment, the shape of the first lattice pattern P1 may be different from the shape of the second lattice pattern P2. In an embodiment, the modulus of the first lattice portion 421 may be different from the modulus of the second lattice portion 425 due to various factors, such as an individual shape, size, density or arrangement structure of the plurality of lattice holes 422 and 426 constituting the first lattice pattern P1 and the second lattice pattern P2.

In an embodiment, the second lattice portion 425 may have a relatively higher modulus than the first lattice portion 421. Since resistance formed by a curve is proportional to rigidity, for the lattice plate 420 having rigidity, the rigidity in some of the lattice plate 420 may be lowered for less resistance, and a modulus, which is a rate of deformation caused by the resistance in a curved structure, may be reduced for less deformation.

In an embodiment, when the first lattice portion 421 has a lower modulus than the second lattice portion 425, the first lattice portion 421 may have a lower deformation rate than the second lattice portion 425 in the case that the same intensity of stress acts per unit area.

In an embodiment, when the first lattice portion 421 has a lower modulus than the second lattice portion 425, the first lattice portion 421 may be more flexible than the second lattice portion 425. As the first lattice portion 421 has a lower rigidity than the second lattice portion 425, the resistance on the curved structure and the deformation rate may reduce.

In an embodiment, the first lattice portion 421 may have a shorter length in the bending direction (e.g., the +/−X directions) and higher resistance than the second lattice portion 425. The first lattice portion 421 may have relatively low rigidity to support high resistance on the short length and thus have a low modulus.

In an embodiment, the second lattice portion 425 may be deformed by a rolling operation of the bending portion 415 of the display panel 410 or comprise a portion separating off due to a loss of adhesion and may require a certain level of rigidity, compared to the first lattice portion 421.

Hereinafter, various embodiments in which the first lattice portion 421 has a lower modulus than the second lattice portion 425 are described. However, an actual implementation is not limited thereto and may vary within a range of being easily configured by a person skilled in the art.

In an embodiment, the plurality of first lattice holes 422 may include a first distance A1, which is an X-direction distance between two first lattice holes 422, and a second distance C1, which is a Y-direction distance, based on two directions (e.g., the X direction and the Y direction) each perpendicular to level surfaces (e.g., X-Y flat surfaces) with the lattice plate 420, when the lattice plate 420 is unfolded. The plurality of first lattice holes 422 may include a first distance B1, which is an X-direction distance, and a second distance D1, which is a Y-direction distance.

In an embodiment, the plurality of second lattice holes 426 may include a third distance A2, which is an X-direction distance between two second lattice holes 426, and a fourth distance C2, which is a Y-direction distance, based on two directions each perpendicular to level surfaces with the lattice plate 420, when the lattice plate 420 is unfolded. The plurality of second lattice holes 426 may include a third distance B2, which is an X-direction distance, and a fourth distance D2, which is a Y-direction distance.

In an embodiment, per unit area, an occupancy ratio of the plurality of first lattice holes 422 to the first lattice portion 421 may be greater than an occupancy ratio of the plurality of second lattice holes 426 to the second lattice portion 425. Since the plurality of lattice holes 422 and 426 are formed by penetrating the lattice plate 420 having rigidity, a modulus may be lowered as the area occupied by the plurality of lattice holes 422 and 426 per unit area increases.

In an embodiment, the average distance between the plurality of first lattice holes 422 may be less than the average distance between the plurality of second lattice holes 426. In an embodiment, as the first lattice holes 422 are densely formed with each other, the area occupied by the plurality of first lattice holes 422 per unit area may increase and the rigidity of the first lattice portion 421 may decrease, thereby reducing the modulus of the first lattice portion 421.

For example, the first distance A1 may be less than the third distance A2 and/or the second distance C1 may be less than the fourth distance C2. In an embodiment, when the average size of the plurality of first lattice holes 422 is substantially the same as or similar to the average size of the plurality of second lattice holes 426, the first distance A1 and/or the second distance C1 in the first lattice portion 421 may be adjusted to be small, so that the modulus of the first lattice portion 421 may reduce. In an embodiment, even in an embodiment in which the average size of the plurality of first lattice holes 422 is different from the average size of the plurality of second lattice holes 426, the first distance A1 and/or the second distance C1 in the first lattice portion 421 may be adjusted to be small, so that the modulus of the first lattice portion 421 may be lower than that of the second lattice portion 425.

In an embodiment, the average size of the plurality of first lattice holes 422 may be greater than the average size of the plurality of second lattice holes 426. In an embodiment, as the size of the plurality of first lattice holes 422 increases, the area occupied by the plurality of first lattice holes 422 per unit area may increase, and the rigidity may decrease, so that the modulus may reduce.

For example, the first distance B1 may be greater than the third distance B2, and/or the second distance D1 may be greater than the fourth distance D2. In an embodiment, when the average distance between the plurality of first lattice holes 422 is substantially equal to or similar with the average distance between the plurality of second lattice holes 426, the first lattice portion 421 may adjust the first distance B1 and/or the second length D1 to be great, so that the modulus may reduce. Even in an embodiment in which the average distance between the plurality of first lattice holes 422 is different from the average distance between the plurality of second lattice holes 426, the first lattice portion 421 may adjust the first distance B1 and/or the second distance D1 to be great so that the modulus of the first lattice portion 421 may be lower than that of the second lattice portion 425.

In an embodiment, per unit area, the number of the plurality of first lattice holes 422 formed in the first lattice portion 421 may be greater than the number of the plurality of second lattice holes 426 formed in the second lattice portion 425. In an embodiment, as the number of the plurality of first lattice holes 422 per unit area increases, the area occupied by the plurality of first lattice holes 422 per unit area may increase and the rigidity of the first lattice portion 421 may decrease, so that the modulus of the first lattice portion 421 may reduce.

The arrangement of the plurality of lattice holes 422 and 426 according to the foregoing embodiments is just an example for lowering the modulus of the first lattice portion 421 and is not limited thereto in an actual implementation. Such an arrangement may be implemented in various manners by simultaneously or individually applying various factors such as an individual shape or a patterning structure of distances A1, C1, A2, and C2, the distances B1, D1, B2, and D2, or the lattice holes 422 and 426.

In an embodiment, in the lattice plate 420, the first lattice plate 424 and the second plate 427 may be formed separately and be joined to each other. In an embodiment, the first lattice portion 421 and the central portion 423 may be included in the first plate 424 and the second lattice portion 425 may be included in the second plate 427. In an embodiment, the first plate 424 may be formed of or include a material that is different from the material of the second plate 427.

For example, as the second plate 427 is made of or includes a material having a relatively greater rigidity than the first plate 424, the modulus of the first lattice portion 421 may lower and the rigidity of the second lattice portion 425 may be reinforced.

In an embodiment, the lattice plate 420 may implement the first plate 424 and the second plate 427, without separation, as a single body made of or including the same material. The lattice plate 420 according to an embodiment may be implemented by making the plurality of lattice holes 422 and 426 to form various lattice patterns in the lattice plate 420.

Figure 7:
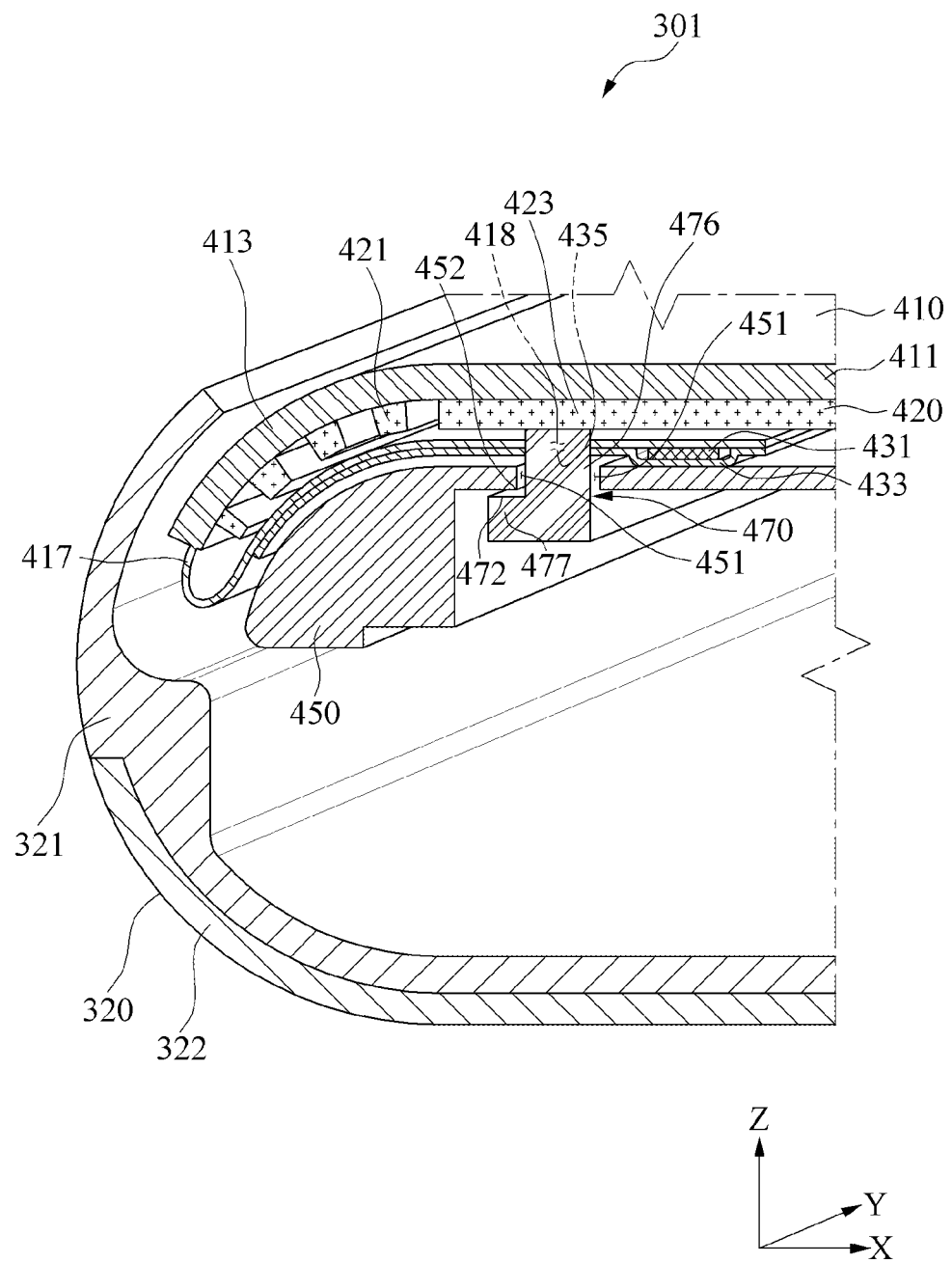
FIG. 7 is a cross-sectional perspective view of an example electronic device, according to an embodiment.

FIG. 7 is a cross-sectional perspective view of an example electronic device 301 according to various embodiments.

Referring to FIG. 7, a second housing 320 of the electronic device 301 according to an embodiment may include a support portion 450 and the electronic device 301 may include a locking member 470.

In an embodiment, a second housing (e.g., the second housing 320 of FIG. 3E) may include a second cover (e.g., the second cover 321 of FIG. 3E) and a third plate (e.g., the third plate 322 of FIG. 3E), and the second housing 320 may further include a support portion 450 supporting a folding portion 417. The support portion 450 may be a portion of the second housing 320 on the rear surface of an edge portion 413 of a display panel 410.

In an embodiment, one surface of the folding portion 417 of the display panel 410 may be supported by the support portion 450 of the second housing 320. The folding portion 417 may extend to a space between the lattice plate 420 and the support portion 450. When a screen display area is viewed, the folding portion 417 may be folded to overlap some of the edge portion 413 and/or the flat portion 411 of the display panel 410. In an embodiment, the folding portion 417 may be supported as the surface of the folding portion 417 opposite to the rear surface facing the lattice plate 420 is in contact with the support portion 450, or the folding portion 417 may be indirectly supported by the support portion 450 through another structure.

In an embodiment, the display panel 410 may include an IC circuit 431 connecting to a surface facing the support portion 450 of the second housing 320 from the folding portion 417 and may include an IC tape 433 covering the IC circuit 431 and the folding portion 417. The IC tape 433 may be attached to at least a portion of the surface of the folding portion 417. The IC tape 433 may adhere the IC circuit 431 to the folding portion 417 and protect the surface of the folding portion 417 and the IC circuit 431.

In an embodiment, when the screen display area is viewed, the support portion 450 may include a first opening 451, which overlaps a flat portion 411, and a first locking area 452 facing the folding portion 417 and extending in a direction of the first opening 451. In an embodiment, the first locking area 452 may be a part of the area that surrounds the first opening 451 in the second housing 320.

In an embodiment, the electronic device 301 may include the locking member 470 including a second locking area 472, which penetrates the first opening 451 to connect to the lattice plate 420 and correspondingly connects to the first locking area 452 to limit a location of the support portion 450.

In an embodiment, the second locking area 472 may be a portion of the locking member 470 protruding in a direction in which the display 361 extends (e.g., the X-Y flat surface direction), based on a direction in which the display 361 is stacked or a direction in which a screen is displayed (e.g., the Z direction). The first locking area 452 may be a portion of the second housing 320 engaged with the second locking area 472. A position, structure, and shape of the first locking area 452 and the second locking area 472 are not limited to those shown in the drawings but may be variously set according to the shape, size and type of the second housing 320 and the locking member 470.

In an embodiment, resistance by a curved structure may occur on the edge portion 413 and the folding portion 417 of the display panel 410, and the resistance may be transmitted by the folding portion 417 to the second housing 320. The first locking area 452 of the second housing 320 may be engaged with the second locking area 472 of the locking member 470, and the locking member 470 may limit a movement scope of the second housing 320 or fix the location of the second housing 320.

In an embodiment, resistance on the support portion 450 of the second housing 320 may disperse and/or be buffered by the locking member 470 and the second housing 320 may stably support the edge portion 413 and/or the folding portion 417 of the display panel 410. The display panel 410 may be supported by the second housing 320 and/or the locking member 470 and reduce deformation or lifting caused by the resistance at the edge portion 413. In an embodiment, the locking member 470 may be fixed to the rear surface of the central portion 423 through an adhesive or a welding process.

In an embodiment, the locking member 470 may pass through the first opening 451 and a second opening 418 of the display panel 410 to connect to the lattice plate 420. The second opening 418 may overlap the first opening 451 in the folding portion 417 when the screen display area is viewed. The locking member 470 may be disposed to pass through the first opening 451 and the second opening 418 at the same time. The description of the second opening 418 is described in detail with reference to FIG. 9.

In an embodiment, when the screen display area is viewed, the IC tape 433 may include a third opening 435 that overlaps the second opening 418 and the locking member 470 may pass through the first opening 451, the second opening 418, and the third opening 435 at the same time to connect to the lattice plate 420.

Referring to FIG. 7, the locking member 470 according to an embodiment may include a fastening portion 476 and a protruding portion 477 and may be a rib structure formed as a single body. The fastening portion 476 may connect to the rear surface of the lattice plate 420 and may extend from the rear surface of the lattice plate 420 in a direction (e.g., the −Z direction) of the second housing 320. The protruding portion 477 may extend from the fastening portion 476 in the direction (e.g., the −X direction) of the first locking area 452 to form the second locking area 472.

In an embodiment, the locking member 470 of the rib structure may form a structure of the second locking area 472 to effectively receive a resistance, considering various factors, such as an internal structure of the electronic device 301, a resistance direction of the display panel 410, or a location of the first opening 451. In an embodiment, the locking member 470 of the rib structure may be easily assembled and have greater durability since the locking member 470 is integrally formed.

Figure 8:
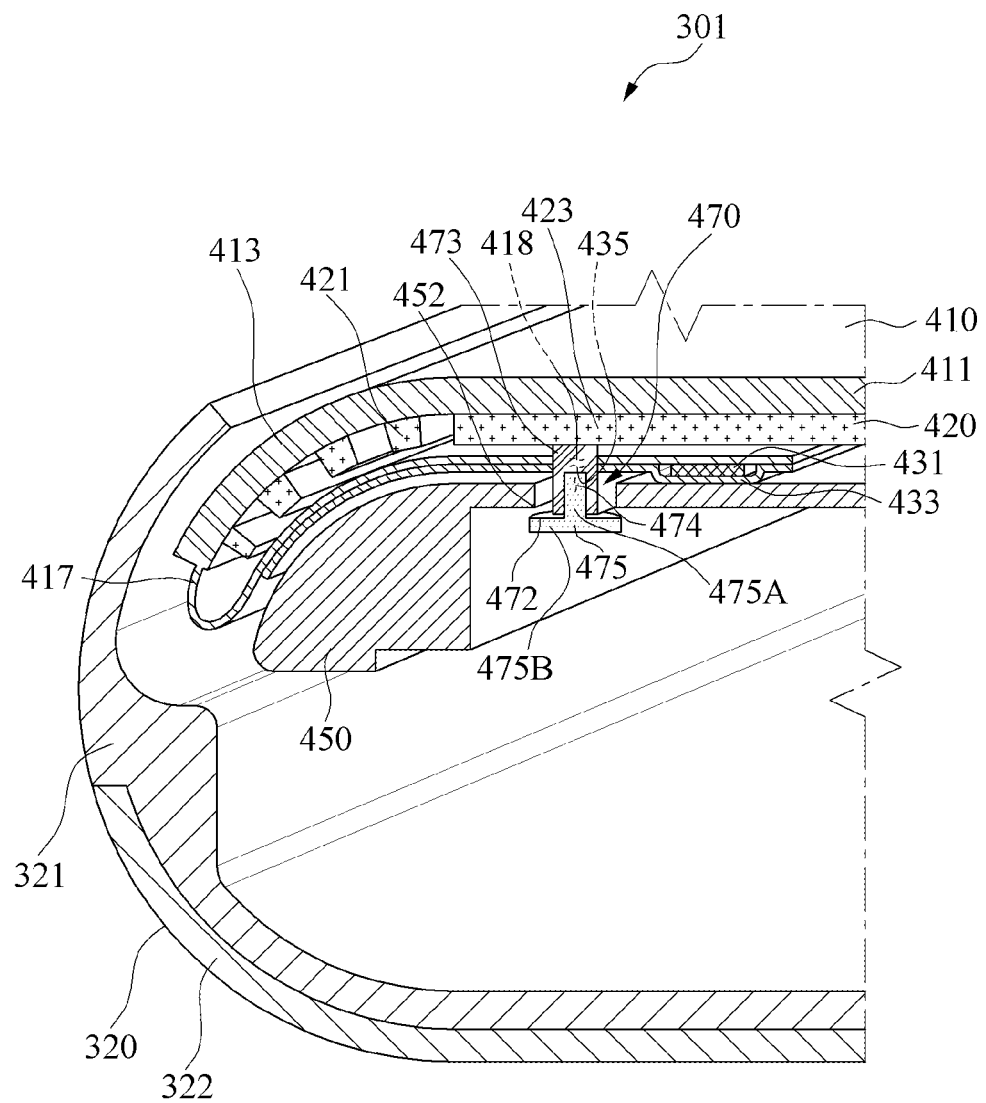
FIG. 8 is a cross-sectional perspective view of an example electronic device according to an embodiment.

FIG. 8 is a cross-sectional perspective view of an example electronic device 301 according to various embodiments.

Referring to FIG. 8, a locking member 470 of the electronic device 301 according to an embodiment may include a fastening member 473 and a support member 475. In the description of FIG. 8, a description of components that are the same as those described above is not repeated and mainly described is a structure of a locking member 470 that is different from the structure (e.g., the rib structure of FIG. 7) of the locking member 470 of FIG. 7.

The locking member 470 according to an embodiment may be a two-part structure including a support member 475 connecting to a fastening member 473. The fastening member 473 may connect to the rear surface of the lattice plate 420, and a fastening groove 474 for fixing the support member 475 may be formed in the fastening member 473. The support member 475 may include a pillar area 475A, which is inserted into the fastening groove 474 of the fastening member 473 to be fixed therein, and a head area 475B, which extends in a direction of a first locking area 452 from the pillar area 475A to form a second locking area 472.

In an embodiment, the locking member 470 of a two-part structure may form a structure of the second locking area 472 to effectively receive a resistance through a structure design of the head area 475B of the support member 475. In an embodiment, in a stage of inspecting and repairing the display panel 410, the locking member 470 of the two-part structure may release only the support member 475 from the fastening member 473 and separate the support member 475 from the display panel 410 while maintaining the fastening member 473 the same and may facilitate the inspection and repair of the display panel 410. Alternatively, even when a resistance is transmitted to the locking member 470 for a long time, the locking member 470 may be relatively easily replaced by maintaining the fastening member 473 fixed and replacing only the support member 475.

Figure 9:
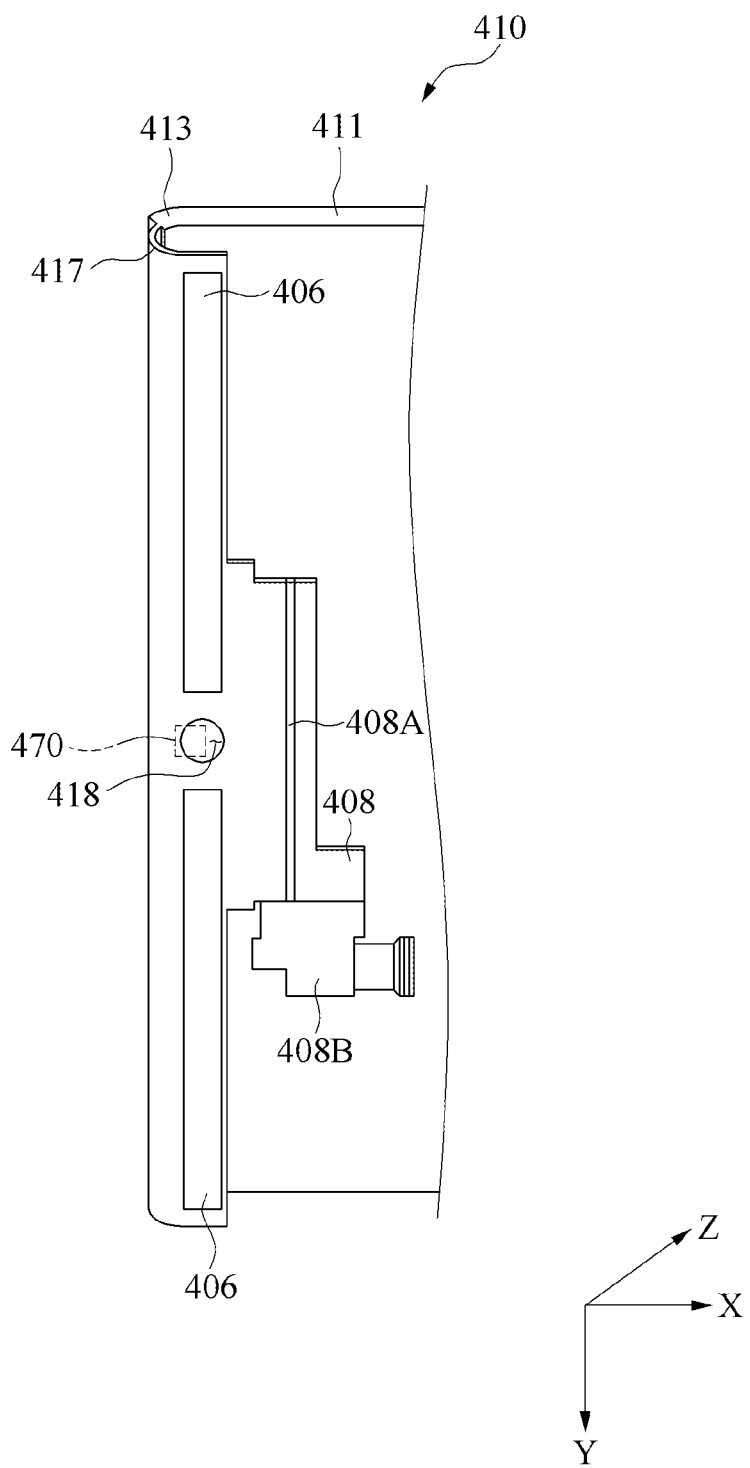
FIG. 9 is a rear view of an example display panel according to an embodiment.

FIG. 9 is a rear view of an example display panel 410 according to various embodiments.

Referring to FIG. 9, a display panel 410 according to an embodiment may include a second opening 418. In the description of FIG. 9, a description that is the same as that given above with respect to the electronic device 301, the support portion 450, and the locking member 470 is not repeated.

In an embodiment, an adhesive member 406 and an FPCB 408 may be provided on a folding portion 417 of the display panel 410. The adhesive member 406 may connect the display panel 410 to a portion of a second housing 320 to fix, for example, a support portion (e.g., the support portion 450 of FIGS. 7 and 8). The adhesive member 406 may be adhesive solid tape but is not limited thereto and may be liquid adhesive solution.

In an embodiment, the FPCB 408 may include a first connecting terminal 408A connecting to the display panel 410 and a second connecting terminal 408B connecting to another device. For example, the second connecting terminal 408B may connect to a processor (e.g., the processor 120 of FIG. 1). In an embodiment, the FPCB 408 may be a part of a display driver IC (e.g., the DDI 230 of FIG. 2).

In an embodiment, the second opening 418 may overlap a first opening 451 and the locking member 470 may pass through the first opening 451 and the second opening 418 at the same time to connect to the lattice plate 420. Although the second housing 320 and the lattice plate 420 are omitted in FIG. 9 for convenience of understanding, when the electronic device 301 according to an embodiment is implemented, the first opening 451 and the locking member 470 of the second housing 320 may be disposed and implemented according to the description of the display panel 410 of FIG. 9.

In an embodiment, the second opening 418 may be substantially at the center of a width direction (e.g., +/−Y direction) perpendicular to a moving direction (e.g., +/−X direction), when a screen display area is viewed. The first opening 451 may overlap the second opening 418.

In an embodiment, resistance on the center of an edge portion 413 may be greater than resistance on an edge of the edge portion 413, based on a width direction (e.g., +/−Y direction), and deformation or lifting by the resistance may occur at the center of the edge portion 413 in the width direction. In an embodiment, the first opening 451 and the second opening 418 may be provided at positions adjacent to the center of the width direction and the locking member 470 may be disposed at the first opening 451 and the second opening 418, so that the locking member 470 may efficiently receive resistance and reduce the deformation or lifting of the display panel 410.

Figure 10:
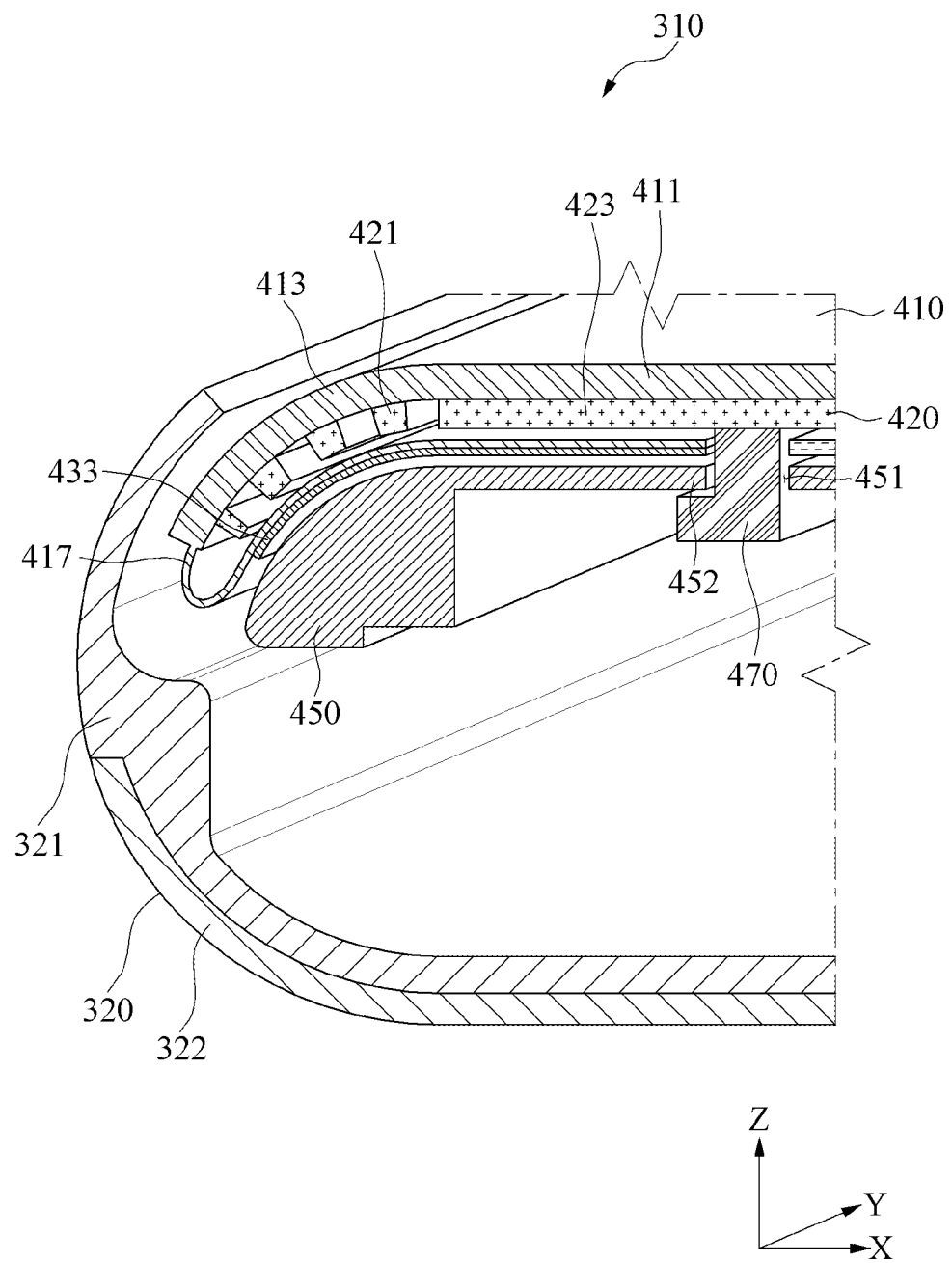
FIG. 10 is a cross-sectional perspective view of an example electronic device according to an embodiment.
Figure 11:
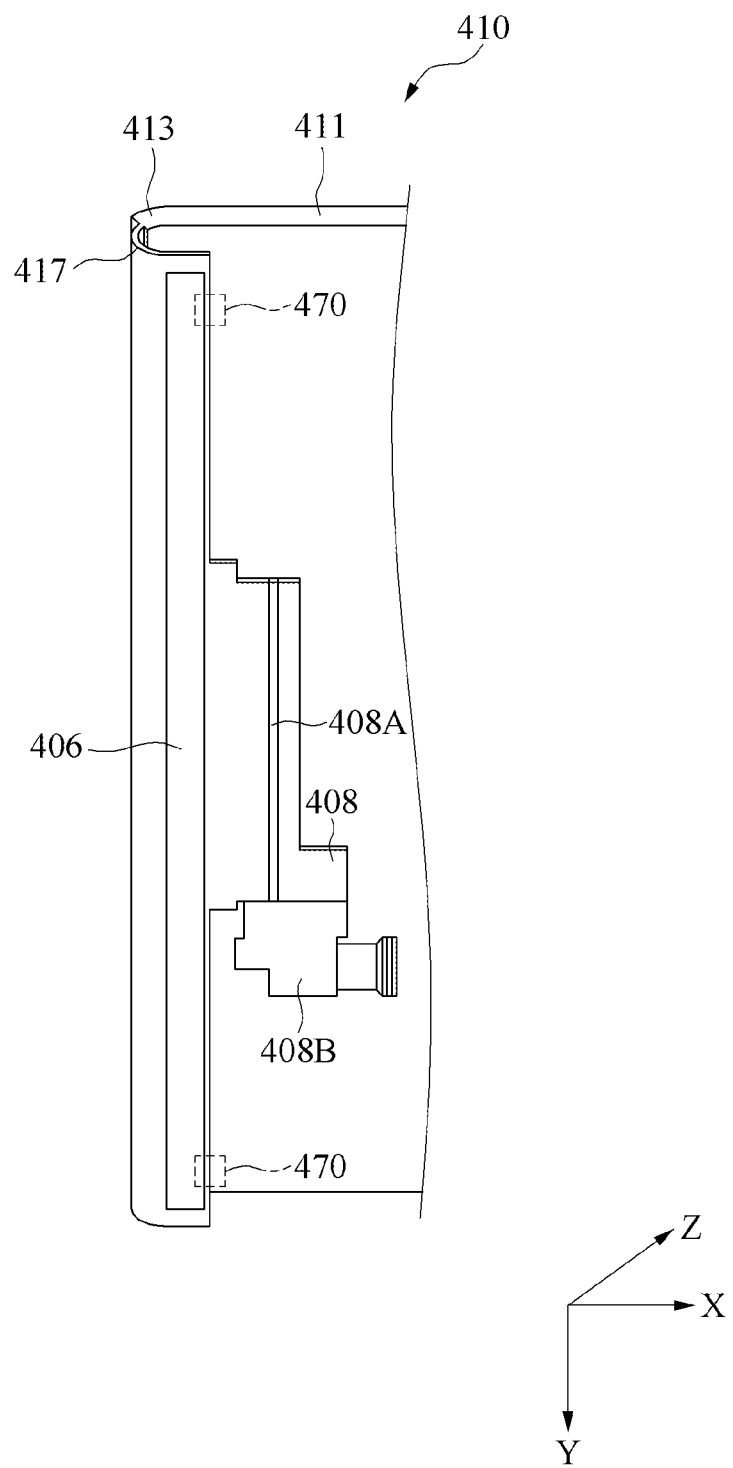
FIG. 11 is a rear view of an example display panel, according to an embodiment.

FIG. 10 is a cross-sectional perspective view of an example electronic device 301 according to various embodiments, and FIG. 11 is a rear view of an example display panel 410 according to various embodiments.

Referring FIGS. 10 and 11, an electronic device 301 according to an embodiment may include a plurality of first openings 451 and a plurality of locking members 470. In the description of FIGS. 10 and 11, a description that is the same as those given above is not repeated, and differences are mainly described.

In an embodiment, the locking member 470 may connect to a lattice plate 420 without passing through a folding portion 417 of a display panel 410. For example, the display panel 410 may not include a second opening 418 and the locking member 470 may pass through the first opening 451 of the second housing 320 and connect to the lattice plate 420.

In an embodiment, the first opening 451 and the locking member 470 may be disposed adjacent to one end portion of an extending direction of the folding portion 417. For example, the locking member 470 may be disposed where the locking member 470 is spaced apart from one end portion of the folding portion 417 or at least a portion of the locking member 470 abuts the one end portion of the folding portion 417. For example, when a screen display area is viewed, the first opening 451 may be formed at a position where the first opening 451 abuts the folding portion 417 or is spaced apart from the folding portion 417, based on one end portion of a moving direction (e.g., +/−X direction) of the folding portion 417.

In an embodiment, the first opening 451 and the locking member 470 may be formed in plurality. For example, the first opening 451 may be formed in plurality such that the first openings 451 are apart from each other based on a width direction (e.g., the +/−Y direction) perpendicular to the moving direction, when the screen display area is viewed. The first locking area 452 may be formed in plurality so that each of the first locking areas 452 abuts each of the first openings 451, and locking member 470 may be formed in plurality so that each of the locking members 470 passes through each of the first openings 451.

In an embodiment, the locking members 470 may be positioned relatively adjacent to a flat portion 411 from the edge portion 413, when the screen display area of the electronic device 301 is viewed. The size of the support portion 450 of the second housing 320 may relatively increase and resistance generated in the display panel 410 may be distributed over a wide area of the second housing 320. In addition, the plurality of locking members 470, as compared with the embodiment including a single locking member 470, may have a decreased resistance received by each of the locking members 470 and more stably support the second housing 320.

The electronic device 301 of an embodiment may omit a process of forming the second opening 418 in the display panel 410 and reduce a durability issue occurring as a portion of the display panel 410 is penetrated or a restriction issue on wiring design. Alternatively, in the electronic device 301, the plurality of locking members 470 may be provided to each buffer resistance in the width direction of the display panel 410, and accordingly, the plurality of locking members 470 may efficiently receive the resistance and reduce deformation or lifting of the display panel 410.

An electronic device 301 according to an embodiment may include a plurality of housings 310 and 320 including a first housing 310 and a second housing 320, wherein the first housing 310 movably connects to the second housing 320 in a moving direction, a display panel 410, in which a screen display area visually exposed to an outside changes depending on a movement of the second housing 320 relative to the first housing 310, and a lattice plate 420 disposed on a rear surface of the display panel 410 to support the display panel 410. The display panel 410 may include a flat portion 411 forming the screen display area and comprising a surface substantially forming a flat surface, an edge portion 413 connected to one end portion of the flat portion 411 and comprising at least a partial region which is curved, and a bending portion 415 connected to the other end portion of the flat portion 411 opposite to the edge portion 413 and comprising at least a partial region which bends according to a movement of the first housing 310 relative to the second housing 320. The lattice plate 420 may include a first lattice portion 421 disposed on a rear surface of the edge portion 413 and including a first lattice pattern P1, and a second lattice portion 425 disposed on a rear surface of the bending portion 415 and including a second lattice pattern P2 that is different from the first lattice pattern P1 so as to have a relatively higher modulus than the first lattice portion 421.

In an embodiment, the first lattice portion 421 may include a plurality of first lattice holes 422 arranged to form the first lattice pattern P1 and the second lattice portion 425 may include a plurality of second lattice holes 426 arranged to form the second lattice pattern P2.

In an embodiment, based on a unit area, an occupancy ratio of the plurality of first lattice holes 422 to the first lattice portion 421 may be greater than an occupancy ratio of the plurality of second lattice holes 426 to the second lattice portion 425.

In an embodiment, an average distance between the plurality of first lattice holes 422 may be less than an average distance between the plurality of second lattice holes 426.

In an embodiment, an average size of the plurality of first lattice holes 422 may be substantially equal to an average size of the plurality of second lattice holes 426.

In an embodiment, based on a unit area, a number of the plurality of first lattice holes 422 formed in the first lattice portion 421 may be greater than a number of the plurality of second lattice holes 426 formed in the second lattice portion 425.

In an embodiment, an average size of the plurality of first lattice holes 422 may be greater than an average size of the plurality of second lattice holes 426.

In an embodiment, the display panel 410 may further include a folding portion 417 connected to the edge portion 413 opposite to the flat portion 411 and comprising at least a partial region which folds in a rear direction of the lattice plate 420. One surface of the folding portion 417 may be supported by the second housing 320.

In an embodiment, the second housing 320 may include a support portion 450 including a first opening 451 overlapping the flat portion 411, in a state in which the screen display area is viewed, and a first locking area 452 disposed to face the folding portion 417 and extending in a direction of the first opening 451. The electronic device 301 may include a locking member 470 including a second locking area 472 connected to the lattice plate 420 by passing through the first opening 451 and correspondingly connected to the first locking area 452 to limit a position of the support portion 450.

In an embodiment, the folding portion 417 may include a second opening 418 overlapping the first opening 451, in a state in which the screen display area is viewed, and the locking member 470 may be connected to the lattice plate 420 by passing through the first opening 451 and the second opening 418 at the same time.

In an embodiment, the first opening 451 and the second opening 418 may be substantially positioned at a center of a width direction perpendicular to the moving direction, in a state in which the screen display area is viewed.

In an embodiment, the first opening 451 may be formed at a position abutting the folding portion 417 or at a position spaced apart from the folding portion 417 by a predetermined distance, based on one end portion of the folding portion 417 in the moving direction, in a state in which the screen display area is viewed.

In an embodiment, the first opening 451 may be formed in plurality such that the first openings are spaced apart from each other, based on a width direction perpendicular to the moving direction, in a state in which the screen display area is viewed, the first locking area 452 may be formed in plurality so that each of the first locking areas 452 is adjacent to each of the plurality of first openings 451, and the locking member 470 may be formed in plurality, so that each of the locking members 470 passes through each of the first openings 451.

In an embodiment, a fastening member 470 may be connected to a rear surface of the lattice plate 420 and comprising a fastening groove 474 formed therein and a support member 475 including a pillar area 475A that is inserted into and fixed into the fastening groove 474 of the fastening member 473 and a head area 475B extending from the pillar area 475A in a direction of the first locking area 452 to form the second locking area 472.

In an embodiment, the locking member 470 may include a fastening portion 476 connected to a rear surface of the lattice plate 420 and extending from the rear surface of the lattice plate 420 in a direction of the second housing 320 and a protruding portion 477 extending from the fastening portion 476 in a direction of the first locking area 452 to form the second locking area 472. The fastening portion 476 and the protruding portion 477 may form a single body.

In addition, an electronic device 301 according to an embodiment may include a plurality of housings 310 and 320 including a first housing 310 and a second housing 320, wherein the first housing 310 movably connects to the second housing 320 in a moving direction, a display panel 410, in which a screen display area visually exposed to an outside changes depending on a movement of the second housing 320 relative to the first housing 310, and a lattice plate 420 disposed on a rear surface of the display panel 410 to support the display panel 410. The display panel 410 may include a flat portion 411 forming the screen display area and comprising a surface substantially forming a flat surface, an edge portion 413 connected to one end portion of the flat portion 411 and comprising at least a partial region which is curved, and a bending portion 415 connected to the other end portion of the flat portion 411 opposite to the edge portion 413 and comprising at least a partial region which bends according to a movement of the first housing 310 relative to the second housing 320. The lattice plate 420 may include a first lattice portion 421 disposed on a rear surface of the edge portion 413 and a second lattice portion 425 disposed on a rear surface of the bending portion 415 and including a material having a relatively greater modulus than a material included in the first lattice portion 421 so as to have a relatively greater modulus than the first lattice portion 421.

In an embodiment, the lattice plate 420 may further include a central portion 423 disposed on a rear surface of the flat portion 411. The central portion 423 may have a relatively greater modulus than the first lattice portion 421.

In an embodiment, the first lattice portion 421 may include a material having a relatively lower modulus than the central portion 423.

In an embodiment, the lattice plate 420 may include a first plate 424 forming the first lattice portion 421 and the central portion 423 and a second plate 427 forming the second lattice portion 425. The first plate 424 and the second plate 427 may be separately formed and comprise at least a partial region that the first plate 424 and the second plate 427 are joined to each other.

In an embodiment, at least a portion of the first lattice 421 may be disposed on the rear surface of the flat portion 411, and the first lattice portion 421 may not overlap the central portion, based on a state in which a surface of the flat portion 411 is viewed.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
   a plurality of housings comprising a first housing and a second housing, wherein the first housing is movably connected to the second housing;
   a display panel in which a screen display area visually exposed to an outside changes based on movement of the second housing relative to the first housing; and
   a lattice plate disposed on a rear surface of the display panel to support the display panel,
   wherein the display panel comprises:
      a flat portion forming the screen display area and comprising a surface substantially forming a flat surface;
      an edge portion at a first end portion of the flat portion and comprising at least a partial region which is curved; and
      a bending portion at a second end portion of the flat portion opposite to the first end portion and comprising at least a partial region which bends according to movement of the first housing relative to the second housing,
   wherein the lattice plate comprises:
      a first lattice portion disposed on a rear surface of the edge portion and comprising a first lattice pattern to provide a first modulus; and
      a second lattice portion disposed on a rear surface of the bending portion and comprising a second lattice pattern different from the first lattice pattern to provide a second modulus higher than the first modulus.

2. The electronic device of claim 1, wherein
   the first lattice portion comprises a plurality of first lattice holes arranged to form the first lattice pattern, and the second lattice portion comprises a plurality of second lattice holes arranged to form the second lattice pattern.

3. The electronic device of claim 2, wherein, based on a unit area, an occupancy ratio of the plurality of first lattice holes to the first lattice portion is greater than an occupancy ratio of the plurality of second lattice holes to the second lattice portion.

4. The electronic device of claim 2, wherein an average distance between the plurality of first lattice holes is less than an average distance between the plurality of second lattice holes.

5. The electronic device of claim 4, wherein an average size of the plurality of first lattice holes is substantially equal to an average size of the plurality of second lattice holes.

6. The electronic device of claim 2, wherein, based on a unit area, a number of the plurality of first lattice holes formed in the first lattice portion is greater than a number of the plurality of second lattice holes formed in the second lattice portion.

7. The electronic device of claim 2, wherein an average size of the plurality of first lattice holes is greater than an average size of the plurality of second lattice holes.

8. The electronic device of claim 1, wherein the display panel further comprises a folding portion at the edge portion opposite to the flat portion and comprising at least a partial region which folds in a rear direction of the lattice plate, wherein one surface of the folding portion is supported by the second housing.

9. The electronic device of claim 8, wherein
the second housing comprises a support portion comprising a first opening overlapping the flat portion, in a state in which the screen display area is viewed, and a first locking area disposed to face the folding portion and extending in a direction of the first opening, and
the electronic device comprises a lock comprising a second locking area connected to the lattice plate by passing through the first opening, and correspondingly connected to the first locking area to limit a position of the support portion.

10. The electronic device of claim 9, wherein
the folding portion comprises a second opening overlapping the first opening in a state in which the screen display area is viewed, and
the lock is connected to the lattice plate by passing through the first opening and the second opening at a same time.

11. The electronic device of claim 10, wherein the first opening and the second opening are substantially positioned at a center of a width direction perpendicular to a moving direction of the second housing, in a state in which the screen display area is viewed.

12. The electronic device of claim 9, wherein the first opening is formed at a position abutting the folding portion or at a position spaced apart from the folding portion by a specified distance, based on a first end portion of the folding portion in a moving direction of the second housing, in a state in which the screen display area is viewed.

13. The electronic device of claim 12, wherein
the first opening is formed in plurality such that the plurality of first openings is spaced apart from each other, based on a width direction perpendicular to the moving direction, in a state in which the screen display area is viewed,
the first locking area is formed in plurality, so that each of the plurality of first locking areas is adjacent to each of the plurality of first openings, and the lock is formed in plurality, so that each of the plurality of locks passes through each of the first openings.

14. The electronic device of claim 9, wherein the lock comprises:
a fastener connected to a rear surface of the lattice plate and comprising a fastening groove formed therein; and
a support comprising a pillar area that is fixed in the fastening groove and a head area extending from the pillar area in a direction of the first locking area to form the second locking area.

15. The electronic device of claim 9, wherein the lock comprises:
a fastener connected to a rear surface of the lattice plate and extending from the rear surface of the lattice plate in a direction of the second housing; and
a protrusion extending from the fastener in a direction of the first locking area to form the second locking area,
wherein the fastener and the protrusion form a single body.

16. An electronic device comprising:
a plurality of housings comprising a first housing and a second housing, wherein the first housing is movably connected to the second housing;
a display panel in which a screen display area visually exposed to an outside changes based on movement of the second housing relative to the first housing; and
a lattice plate disposed on a rear surface of the display panel to support the display panel,
wherein the display panel comprises:
a flat portion forming the screen display area and comprising a surface substantially forming a flat surface;
an edge portion at a first end portion of the flat portion and comprising at least a partial region which is curved; and
a bending portion at a second end portion of the flat portion and comprising at least a partial region which bends,
wherein the lattice plate comprises:
a first lattice portion disposed on a rear surface of the edge portion and having a first modulus; and
a second lattice portion disposed on a rear surface of the bending portion and having a second modulus greater than the first modulus.

17. The electronic device of claim 16, wherein the lattice plate further comprises a central portion disposed on a rear surface of the flat portion,
wherein the central portion has a third modulus greater than the first modulus.

18. The electronic device of claim 17, wherein the first lattice portion comprises a material having a modulus less than the third modulus.

19. The electronic device of claim 17, the lattice plate comprises:
a first plate forming the first lattice portion and the central portion; and
a second plate forming the second lattice portion,
wherein the first plate and the second plate comprise at least a partial region at which the first plate and the second plate are joined.

20. The electronic device of claim 17, wherein at least a portion of the first lattice portion is disposed on the rear surface of the flat portion, and the first lattice portion does not overlap the central portion, based on a state in which a surface of the flat portion is viewed.

* * * * *